US011832205B2

(12) United States Patent
Ryu et al.

(10) Patent No.: US 11,832,205 B2
(45) Date of Patent: Nov. 28, 2023

(54) OPEN LOOP UPLINK TIMING ADVANCE

(71) Applicant: QUALCOMM Incorporated, San Diego, CA (US)

(72) Inventors: Jung Ho Ryu, Fort Lee, NJ (US); Navid Abedini, Somerset, NJ (US); Junyi Li, Chester, NJ (US); Karl Georg Hampel, Hoboken, NJ (US); Juergen Cezanne, Ocean Township, NJ (US); Sundar Subramanian, San Diego, CA (US); Jianghong Luo, Skillman, NJ (US); Muhammad Nazmul Islam, Edison, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 16/178,964

(22) Filed: Nov. 2, 2018

(65) Prior Publication Data

US 2019/0159149 A1    May 23, 2019

Related U.S. Application Data

(60) Provisional application No. 62/589,428, filed on Nov. 21, 2017.

(51) Int. Cl.
*H04W 56/00* (2009.01)
*G01S 13/74* (2006.01)
(Continued)

(52) U.S. Cl.
CPC ..... *H04W 56/006* (2013.01); *H04W 56/0045* (2013.01); *G01S 5/0027* (2013.01); *G01S 13/74* (2013.01); *G01S 19/51* (2013.01)

(58) Field of Classification Search
CPC .......... H04W 56/006; H04W 56/0045; H04W 56/0055; G01S 5/0027; G01S 19/51; G01S 13/74; G01S 5/0018; G01S 19/42
See application file for complete search history.

(56) References Cited

U.S. PATENT DOCUMENTS

| 10,317,448 B2 * | 6/2019 | Streett ................... G01R 29/12 |
| 2011/0051633 A1 * | 3/2011 | Pan ................... H04W 56/0045 |
| | | 370/336 |

(Continued)

FOREIGN PATENT DOCUMENTS

| CN | 104272821 A | 1/2015 |
| EP | 2367386 A1 | 9/2011 |

(Continued)

OTHER PUBLICATIONS

International Search Report and Written Opinion—PCT/US2018/059250—ISA/EPO—dated Feb. 12, 2019.

(Continued)

*Primary Examiner* — Un C Cho
*Assistant Examiner* — Lalita W Pace
(74) *Attorney, Agent, or Firm* — Holland & Hart LLP

(57) ABSTRACT

Methods, systems, and devices for wireless communications are described. A user equipment (UE) may identify that an uplink transmission to a base station is to occur in accordance with an uplink timing advance value representing an amount of time that the uplink transmission takes from transmission at the UE to reception at the base station. The UE may perform an autonomous open-loop adjustment to the uplink timing advance value. The UE may transmit the uplink transmission to the base station in accordance with the adjusted uplink timing advance value. The base station may transmit an indication of a set of uplink timing advance values for a UE to use for uplink transmissions, each of the set of uplink timing advance values representing an amount (Continued)

of time that an uplink transmission is expected to take from transmission at the UE to reception at the base station.

17 Claims, 17 Drawing Sheets

(51) Int. Cl.
*G01S 19/51* (2010.01)
*G01S 5/00* (2006.01)

(56) References Cited

U.S. PATENT DOCUMENTS

| | | |
|---|---|---|
| 2012/0014371 A1 | 1/2012 | Weng et al. |
| 2012/0282969 A1* | 11/2012 | Jiang ................. H04W 56/0045 455/517 |
| 2013/0084884 A1* | 4/2013 | Teyeb .................. H04W 48/04 455/456.1 |
| 2013/0258959 A1* | 10/2013 | Dinan ............... H04W 74/0833 370/329 |
| 2013/0279433 A1 | 10/2013 | Dinan et al. |
| 2013/0301619 A1* | 11/2013 | Singh ................ H04W 56/0045 370/336 |
| 2014/0086219 A1 | 3/2014 | Suzuki et al. |
| 2014/0119206 A1* | 5/2014 | Vargantwar ........... H04W 56/00 370/252 |
| 2014/0198773 A1* | 7/2014 | Yin .................. H04W 56/0045 370/336 |
| 2015/0085839 A1* | 3/2015 | Bergstrom ............ H04L 5/0078 370/336 |
| 2016/0028533 A1* | 1/2016 | Kazmi .............. H04W 56/0045 370/296 |
| 2016/0088577 A1* | 3/2016 | Cui .................. H04W 72/0446 370/336 |
| 2016/0099769 A1* | 4/2016 | Moffatt ................ H04B 7/1555 455/431 |
| 2016/0105863 A1* | 4/2016 | Li ....................... H04W 72/042 370/330 |
| 2016/0105886 A1 | 4/2016 | Li et al. |
| 2016/0211999 A1* | 7/2016 | Wild ................. H04L 25/03891 |
| 2016/0242092 A1* | 8/2016 | Rosa ..................... H04W 36/30 |
| 2016/0345316 A1* | 11/2016 | Kazmi ............. H04W 74/0833 |
| 2017/0111886 A1* | 4/2017 | Kim ...................... H04W 48/14 |
| 2017/0331577 A1* | 11/2017 | Parkvall ............... H04L 5/1469 |
| 2018/0192387 A1* | 7/2018 | Jung ................ H04W 56/0045 |
| 2018/0310321 A1* | 10/2018 | Basu Mallick ....... H04W 48/16 |
| 2019/0045481 A1* | 2/2019 | Sang ..................... H04B 1/713 |
| 2019/0053182 A1* | 2/2019 | Choi .................... H04W 48/12 |
| 2019/0081753 A1* | 3/2019 | Jung .................... H04L 5/0023 |
| 2019/0380154 A1* | 12/2019 | Wei .................. H04W 74/0833 |

FOREIGN PATENT DOCUMENTS

| | | |
|---|---|---|
| EP | 2876964 A1 | 5/2015 |
| WO | WO-2013169162 A1 | 11/2013 |

OTHER PUBLICATIONS

Huawei, et al., "Considerations on Timing Advance Design in NR", 3GPP Draft, 3GPP TSG RAN WG1 Meeting #89, R1-1706929, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017, May 8, 2017 (May 18, 2017), XP051263391, 3 Pages, Retrieved from the Internet: URL: http://www.3gpp.org/ftp/tsg_ran/WG1_RL1/TSGR1_89/Docs/. [retrieved on May 8, 2017] the whole document.

Huawei, et al., "Maintenance of Uplink Time Alignment in NR", 3GPP Draft, 3GPPTSG-RAN WG2 #99bis meeting, R2-1711438 Maintenance of Uplink Time Alignment in NR, 3rd Generation Partnership Project (3GPP), Mobile Competence Centre, 650, Route Des Lucioles, F-06921 Sophia-Antipolis Cedex, Fran vol. RAN WG2, No. Prague, Czech Republic, Oct. 9, 2017-Oct. 13, 2017 Oct. 8, 2017 (Oct. 8, 2017), XP051343423, 3 Pages, Retrieved from the Internet: URL:http://www.3gpp.org/ftp/Meetings_3GPP_SYNC/RAN2/Docs/ [retrieved on Oct. 8, 2017].

* cited by examiner

OPEN LOOP UPLINK TIMING ADVANCE

CROSS REFERENCES

The present Application for Patent claims the benefit of U.S. Provisional Patent Application No. 62/589,428 by RYU et al., entitled "OPEN LOOP UPLINK TIMING ADVANCE," filed Nov. 21, 2017, assigned to the assignee hereof, and expressly incorporated by reference herein.

BACKGROUND

The following relates generally to wireless communication, and more specifically to open loop uplink timing advance.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communications systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

Communications in a mmW network may be highly directional and line-of-sight (LOS) dependent. These features of a mmW network may be amplified in specific environments. For example, the directionality of a mmW network may be enhanced when operated in a particular deployment scenario, such as a subway or train environment, where UEs associated with the train tend to move in a limited number of directions (e.g., as determined by the movement of the train).

Communication may have an associated round-trip-time (RTT) that varies based on the distance between the transmitting device and the receiving device. The RTT may broadly refer to the time it takes for a signal to propagate from the transmitting device to the receiving device, for the receiving device to process the signal and transmit a response signal, and for the transmitting device to receive the response signal. In a downlink communication example, this results in a time gap ($\Delta$) between the end of a downlink message transmitted from the base station and the beginning of a responsive uplink message received at the base station. This may introduce complexity in that the base station may benefit from knowing when to look for the uplink message, e.g., when to configure a receive beam configuration to receive the uplink message. Conventional techniques may include the base station instructing the UE to advance its uplink transmission time by a certain value ($\varepsilon$) in order for the base station to know when to look for the uplink message. This timing advance process, however, includes the base station and UE exchanging timing measurement signals, timing commands, etc., during a timing advance procedure. The timing advance procedure, therefore, utilizes a considerable amount of valuable overhead resources.

SUMMARY

The described techniques relate to improved methods, systems, devices, or apparatuses that support open loop uplink timing advance. Generally, the described techniques provide for omission of the timing advance procedure. For example, the base station and the user equipment (UE) may not perform a timing advance procedure and, instead, may rely on the UE autonomously performing an open-loop uplink timing advance adjustment for an uplink transmission. For example, the UE may determine that the uplink transmission is to occur using an uplink timing advance. The uplink timing advance generally refers to the amount of time that the UE transmits the uplink transmission before the scheduled uplink transmission time in order for the base station to receive the uplink transmission at the scheduled uplink transmission time. In some aspects, the uplink timing advance value may be based on a propagation time for the uplink transmission. The propagation time may change based on where the UE is with respect to the base station. The UE may autonomously perform an open-loop adjustment to the uplink timing advance value based, at least in certain examples, on the distance/orientation of the UE with respect to the base station. For example, the UE may calculate the distance from the base station to the UE and use the distance information to adjust the uplink timing advance value. The UE may then transmit the uplink transmission using the adjusted uplink timing advance value. The UE autonomously adjusts the uplink timing value without having to perform and/or maintain a timing advance procedure.

In some aspects, the base station may provide a set of available uplink timing advance values that the UE may use, at least to some degree. For example, the base station may transmit a message to the UE that carries or otherwise conveys an indication of the set of uplink timing advance values to use for uplink transmissions. Each uplink timing advance value may be an amount of time that an uplink transmission is expected to take from transmission at the UE to reception at the base station. The UE may use some or all of the uplink timing advance values, e.g., as initial uplink timing advance values that are then adjusted during the open-loop adjustment. The set of available uplink timing advance values may be absolute values (e.g., fixed time values) and/or relative values (e.g., with reference to a common source, such as a shared clock, a subframe number, etc.).

A method of wireless communication is described. The method may include identifying that an uplink transmission to a base station is to occur in accordance with an uplink timing advance value representing an amount of time that the uplink transmission takes from transmission at the UE to reception at the base station, performing an autonomous open-loop adjustment to the uplink timing advance value, and transmitting the uplink transmission to the base station in accordance with the adjusted uplink timing advance value.

An apparatus for wireless communication is described. The apparatus may include means for identifying that an uplink transmission to a base station is to occur in accordance with an uplink timing advance value representing an amount of time that the uplink transmission takes from transmission at the UE to reception at the base station, means for performing an autonomous open-loop adjustment to the uplink timing advance value, and means for transmitting the uplink transmission to the base station in accordance with the adjusted uplink timing advance value.

Another apparatus for wireless communication is described. The apparatus may include a processor, memory in electronic communication with the processor, and instructions stored in the memory. The instructions may be operable to cause the processor to identify that an uplink transmission to a base station is to occur in accordance with an uplink timing advance value representing an amount of time that the uplink transmission takes from transmission at the UE to reception at the base station, perform an autonomous open-loop adjustment to the uplink timing advance value, and transmit the uplink transmission to the base station in accordance with the adjusted uplink timing advance value.

A non-transitory computer-readable medium for wireless communication is described. The non-transitory computer-readable medium may include instructions operable to cause a processor to identify that an uplink transmission to a base station is to occur in accordance with an uplink timing advance value representing an amount of time that the uplink transmission takes from transmission at the UE to reception at the base station, perform an autonomous open-loop adjustment to the uplink timing advance value, and transmit the uplink transmission to the base station in accordance with the adjusted uplink timing advance value.

Some examples of the method, apparatus, and non-transitory computer-readable medium described herein may further include processes, features, means, or instructions for calculating a distance between the UE and the base station, and the uplink timing advance value may be adjusted based at least in part on the distance.

Some examples of the method, apparatus, and non-transitory computer-readable medium described herein may further include processes, features, means, or instructions for identifying a satellite positioning system (SPS) coordinate of the UE and a SPS coordinate of the base station, and the distance may be calculated based on the SPS coordinates.

In some examples of the method, apparatus, and non-transitory computer-readable medium described herein, the distance comprises at least one of a physical distance between the UE and the base station, or an angular distance between the UE and the base station, or a travel distance from the UE to the base station, or a round-trip-time (RTT) distance associated with a wireless transmission between the UE and the base station, or a combination thereof.

Some examples of the method, apparatus, and non-transitory computer-readable medium described herein may further include processes, features, means, or instructions for determining a downlink beam configuration for a downlink transmission from the base station, and the uplink timing advance value may be adjusted based at least in part on the downlink beam configuration.

In some examples of the method, apparatus, and non-transitory computer-readable medium described herein, the downlink beam configuration may be mapped to one or more uplink timing advance values of a plurality of available uplink timing advance values.

In some examples of the method, apparatus, and non-transitory computer-readable medium described herein, the downlink beam configuration comprises at least one of a downlink beam direction, or a downlink beam index, or a downlink beam departure angle, or a combination thereof.

Some examples of the method, apparatus, and non-transitory computer-readable medium described herein may further include processes, features, means, or instructions for receiving a signal from the base station indicating the that the UE may be to use a second adjusted uplink timing advance value, the second uplink adjusted uplink timing advance value being different from the adjusted uplink timing advance value.

Some examples of the method, apparatus, and non-transitory computer-readable medium described herein may further include processes, features, means, or instructions for receiving a signal from the base station indicating a set of available uplink timing advance values, and the uplink timing advance value may be identified from the set of available uplink timing advance values.

Some examples of the method, apparatus, and non-transitory computer-readable medium described herein may further include processes, features, means, or instructions for receiving an indication from the base station triggering the UE to perform the open-loop adjustment procedure based at least in part on the set of available uplink timing advance values.

In some examples of the method, apparatus, and non-transitory computer-readable medium described herein, the adjusted uplink timing advance value may be identified from the set of available uplink timing advance values.

A method of wireless communication is described. The method may include transmitting an indication of a set of uplink timing advance values for a UE to use for uplink transmissions, each of the set of uplink timing advance values representing an amount of time that an uplink transmission is expected to take from transmission at the UE to reception at the base station and receiving an uplink transmission from the UE in accordance with an adjusted uplink timing advance value, and the UE adjusts the uplink timing advance value in accordance with an autonomous open-loop adjustment.

An apparatus for wireless communication is described. The apparatus may include means for transmitting an indication of a set of uplink timing advance values for a UE to use for uplink transmissions, each of the set of uplink timing advance values representing an amount of time that an uplink transmission is expected to take from transmission at the UE to reception at the base station and means for receiving an uplink transmission from the UE in accordance with an adjusted uplink timing advance value, and the UE adjusts the uplink timing advance value in accordance with an autonomous open-loop adjustment.

Another apparatus for wireless communication is described. The apparatus may include a processor, memory in electronic communication with the processor, and instructions stored in the memory. The instructions may be operable to cause the processor to transmit an indication of a set of uplink timing advance values for a UE to use for uplink transmissions, each of the set of uplink timing advance values representing an amount of time that an uplink transmission is expected to take from transmission at the UE to reception at the base station and receive an uplink transmission from the UE in accordance with an adjusted uplink timing advance value, and the UE adjusts the uplink timing advance value in accordance with an autonomous open-loop adjustment.

A non-transitory computer-readable medium for wireless communication is described. The non-transitory computer-readable medium may include instructions operable to cause a processor to transmit an indication of a set of uplink timing advance values for a UE to use for uplink transmissions, each of the set of uplink timing advance values representing an amount of time that an uplink transmission is expected to take from transmission at the UE to reception at the base station and receive an uplink transmission from the UE in accordance with an adjusted uplink timing advance value, and the UE adjusts the uplink timing advance value in accordance with an autonomous open-loop adjustment.

In some examples of the method, apparatus, and non-transitory computer-readable medium described herein, the adjusted uplink timing advance value may be from the set of uplink timing advance values.

In some examples of the method, apparatus, and non-transitory computer-readable medium described herein, the adjusted uplink timing advance value may be different from the uplink timing advance values of the set of uplink timing advance values.

In some examples of the method, apparatus, and non-transitory computer-readable medium described herein, the autonomous open-loop adjustment may be based on at least one of a distance between the UE and the base station, or a downlink beam configuration associated with a downlink transmission from the base station, or a combination thereof.

In some examples of the method, apparatus, and non-transitory computer-readable medium described herein, the set of uplink timing advance values comprise at least one of a set of absolute uplink timing advance values, or a set of relative uplink timing advance values with respect to a reference time, or a combination thereof.

DETAILED DESCRIPTION

Figure 1:
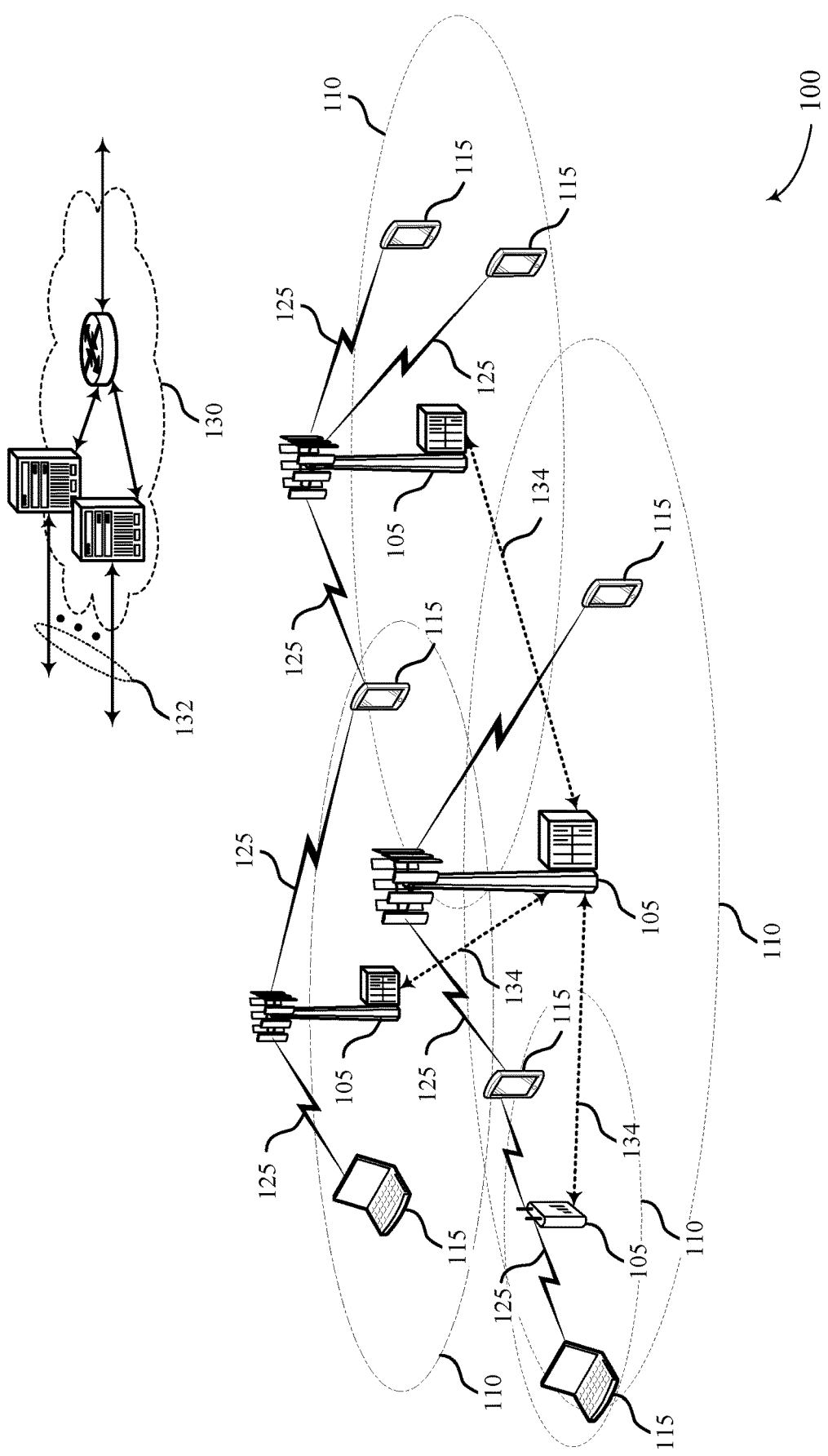
FIG. 1 illustrates an example of a system for wireless communication that supports open loop uplink timing advance in accordance with aspects of the present disclosure.

Next generation wireless communications systems may rely on millimeter wave (mmW) communication technologies. mmW technologies typically use beamformed transmissions/receptions to provide directional communications. Each beamformed transmission/reception may have an associated beam configuration, such as a beam width, a beam direction, a beam shape, and the like. A transmit beam may refer to a digital/analog antenna configuration that provides a directional transmission towards a receiving device, such as a user equipment (UE). A receive beam may refer to a digital/analog antenna configuration that provides directional reception of a beam from a transmitting device. For a beam pair used for wireless communications, the transmit beam may be the same as or different from the receive beam (e.g., due to beam reflection, diffraction, and the like). The transmit/receive beams may change for each transmission.

mmW wireless communications systems present unique challenges with respect to timing, interference management, medium access, and the like. For example, the directionality of transmissions and/or receptions prove a certain level of deafness in a mmW network, e.g., a device may be "deaf" with respect to an incoming beamformed signal if the device's receive beam configuration is not directed toward the transmitting device. Accordingly, timing (e.g., the transmitting device knowing when to transmit a message and/or the receiving device knowing when to expect to receive the signal) may become an important consideration. Conventional timing protocol may rely on a timing advance procedure between the transmitting/receiving devices. However, the timing advance procedure may require multiple timing signals and/or timing commands being exchanged, which takes considerable time to complete and uses valuable overhead resources.

Aspects of the disclosure are initially described in the context of a wireless communications system. Broadly, aspects of the disclosure provide for omission of the timing advance procedure and, instead, use of an open-loop adjustment of the uplink timing advance value by the UE. For example, the UE may determine that an uplink transmission to the base station is to occur. The uplink transmission may have an associated uplink timing advance value that, at least in certain aspects, is based on the propagation time between the UE and the base station. However, instead of relying on a conventional timing advance procedure being performed, the UE may autonomously adjust the uplink timing advance value based, for example, on a distance (e.g., an angular distance, a geographical distance, and the like) between the UE and the base station. The UE may then transmit the uplink transmission to the base station using the adjusted uplink timing advance value. Accordingly, the uplink communications between the base station and UE may occur without any sort of timing advance procedure.

In some aspects, the base station may configure the UE with a set of available uplink timing advance values. For example, the base station may transmit an indication to the UE of the set of available uplink timing advance values. The UE may use at least one of the uplink timing advance values as a starting point when performing the open-loop timing advance value adjustment procedure.

Aspects of the disclosure may be used in environments where a maximum RTT of UEs within a coverage area of a base station is small enough so as to not result in significant communication delays. One example of an applicable environment is a train environment, where UEs on a train are in communication with base stations along the train route. The base stations may be positioned along the train route such that a linear density of the base stations along the train route facilitates relatively small maximum RTTs for UEs associated with the trains.

Aspects of the disclosure are further illustrated by and described with reference to apparatus diagrams, system diagrams, and flowcharts that relate to open loop uplink timing advance.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 may transmit an indication of a set of uplink timing advance values for a UE 115 to use for uplink transmissions, and each of the set of uplink timing advance values may represent an amount of time that an uplink transmission is expected to take from transmission at the UE 115 to reception at the base station 105. The base station 105 may receive an uplink transmission from the UE 115 in accordance with an adjusted uplink timing advance value, and the UE 115 adjusts the uplink timing advance value in accordance with an autonomous open-loop adjustment.

One or more of the UEs 115 may identify that an uplink transmission to a base station 105 is to occur in accordance with an uplink timing advance value representing an amount of time that the uplink transmission takes from transmission at the UE to reception at the base station. The UE 115 may perform an autonomous open-loop adjustment to the uplink timing advance value. The UE 115 may transmit the uplink transmission to the base station 105 in accordance with the adjusted uplink timing advance value.

In some cases, timing advance procedures for beamform scheduling, transmission, and reception require significant resource overhead, such as signal processing, compute, transmission, and reception overhead. Furthermore, timing advance procedures may not be suitable in a high mobility (e.g., UE 115 mobility) environment. The implementations described herein provide communication techniques between a UE 115 and a base station 105 without the resource intensive timing advance procedures. Accordingly, resources may be saved for other uses, and the timing advance procedure may be avoided in high-mobility environments.

Figure 2:
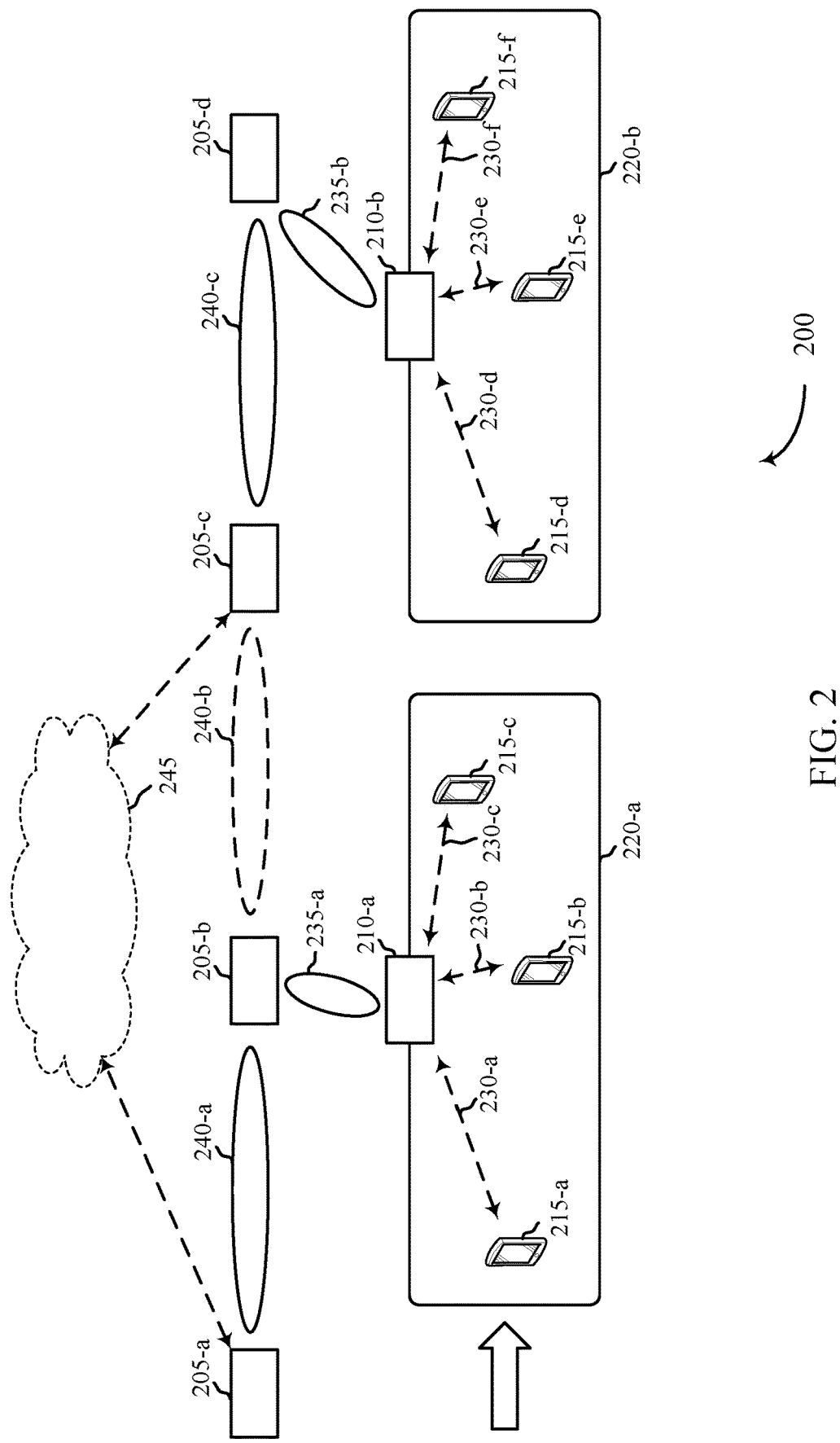
FIG. 2 illustrates an example of a system for wireless communication that supports open loop uplink timing advance in accordance with aspects of the present disclosure.

FIG. 2 illustrates an example of a system for wireless communications system 200 that supports open loop uplink timing advance in accordance with various aspects of the present disclosure. In some examples, wireless communications system 200 may implement aspects of wireless communications system 100. Wireless communications system 200 may include a plurality of base stations 205, relay UE 210, and UE 215, which may be examples of the corresponding devices described herein.

In some aspects, the deployment scenario of wireless communications system 200 may include relay UEs 210 being mounted into vehicles 220. For example, relay UE 210-a may be mounted into vehicle 220-a and relay UE 210-b may be mounted into vehicle 220-b. Each of the vehicles 220 may include any mobile vehicle, such as an automobile, a bus, a train, a boat, a ship, a plane, and the like, that travels along a path. Accordingly, each base station 205 may be mounted in a fixed location and communicate with the relay UE 210 as the corresponding vehicle 220 traverses the coverage area of the respective base station 205. In one non-limiting example, the wireless communications system 200 may support deployment of a system where the vehicles 220 (and hence the mounted relay UEs 215) are traveling at a high rate of speed, such as a high-speed rail system. Accordingly, relay UEs 210 may be considered in a high-mobility state of operation when the vehicles 220 are in motion.

In some aspects, wireless communications system 200 illustrates one example deployment of a heterogeneous wireless communications system that utilizes more than one radio access technology (RAT). As one example, base stations 205 may be mmW gNBs that perform inter-base station communications using beamformed signals 240 and/or using wired communication links (not shown). In some aspects, some or all of the base stations 205 may be connected to a core network 245 via a backhaul link, e.g., an integrated access backhaul (IAB). In the example illustrated in FIG. 2, only base stations 205-a and 205-c have direct connections to the core network 245. In this example, base station 205-b may connect to the core network 245 via beamformed signal 240-a through base station 205-a and/or optionally via beamformed signal 240-b through base station 205-c. Similarly, base station 205-d may connect to the core network 245 via beamformed signal 240-c through base station 205-c. As can be appreciated, the number and spacing of base stations 205 and/or direct backhaul connections to the core network 245 may vary and may depend on the particular deployment scenario.

Another example of the heterogeneous deployment may include wireless links 230 between relay UEs 210 and UEs 215. In some aspects, the number and/or position of UEs 215 within a vehicle 220 may vary at any given time. For example, certain UEs 215 may depart a vehicle 220 at a first stop while other UEs 215 enter vehicle 220 at the first stop. The number and/or position of UEs 215 may change for any given stop that vehicle 220 makes. When UEs 215 enter a vehicle, the UEs 215 may establish a wireless link 230 with the relay UE 210. The wireless link 230 may be an example of any wireless RAT, such as cellular, Wi-Fi, Bluetooth, Near Field Communication (NFC), and the like. UEs 215 may then access the core network 245 via the respective relay UE 215. Each relay UE 210 may access the core network 245 using a beamformed signal 235 through an associated base station 205. For example, UE 215-a may communicate with relay UE 210-a via wireless link 230-a, relay UE 210-a may communicate with base station 205-b via beamformed signal 235-a, base station 205-b may communicate with base station 205-a via beamformed signal 240-a, and base station 205-a may provide the direct link to core network 245. As another example and for vehicle 220-b, UE 215-e may communicate with relay UE 210-b via wireless link 230-e, relay UE 210-b may communicate with base station 205-d via beamformed signal 235-b, base station 205-d may communicate with base station 205-c via beamformed signal 240-c, and base station 205-c may provide the direct link to core network 245. In some examples, relay UE 210 may be a mmW relay UE.

In some aspects, as vehicles 220 travel along a path, relay UEs 210 may change the base station 205 that they are associated with. For example, relay UE 210-a may initially be connected to base station 205-b and, as vehicle 220-a travels, relay UE 210-*a* may leave the coverage area of base station 205-*b* and enter the coverage area of base station 205-*c*. Accordingly, relay UE 210-*a* may establish a new connection to base station 205-*c*.

In some aspects, the beam configuration for beamformed signals 235 for any given communication may vary depending upon where the relay UE 215 is located with respect to the base station 205 that it is connected to. For example, relay UE 210-*a* is located relatively closer to base station 205-*b* than relay UE 210-*b* is located with respect to base station 205-*d*. Accordingly, the beam configuration for beamformed signal 235-*a* has a different departure angle, beam direction, beam transmit power, and the like, than beamformed signal 235-*b*. Each beam configuration for beamformed signals 235 may have an associated beam index, e.g., an identifier that is associated with the beam configuration. The beam index being associated with a particular beam configuration may provide an indication of various parameters of the beam configuration, e.g., beam angle, beam departure angle, beam shape, beam transmit power, and the like. In some aspects, information indicative of the beam index is carried or otherwise conveyed in the associated beamformed signal 235.

In some aspects, the associated signal propagation time (e.g., propagation RTT) for a particular beamformed signal 235 will also vary based on the distance and/or orientation between the relay UE 210 and the base station 205 that it is connected to. For example, the propagation RTT for beamformed signal 235-*a* is shorter than the propagation RTT for beamformed signal 235-*b*. Accordingly, base station 205-*a* may have a different associated propagation RTT with the relay UEs 210 that it is associated with than base station 205-*d* has with the relay UEs 210 that it is associated with. As the distance between the relay UE 210 and the base station 205 that it is connected to increases (e.g., as the relay UE 210 approaches the edge of the coverage area of one base station 205), the beam configuration and associated propagation RTT varies. In some aspects, the propagation RTT may also include processing time at the respective device, e.g., time for the device to process the message, reconfigure from transmit to receive mode, or vice versa, and the like.

To support wireless communications, such as beamformed signals 235, base stations 205 and relay UEs 210 may be configured to support omitting timing advance procedures in accordance with aspects of the present disclosure. Conventional timing advance techniques include the base station 205 exchanging various timing measurement signals, timing advance commands, and the like, in order to establish timing alignment. However, this technique takes considerable time and/or resources to complete and maintain. Instead, the relay UEs 210 may autonomously (e.g., without being instructed to do so and/or how to do so from the base station 205) perform an open-loop adjustment of the uplink timing advance value. For example, the relay UE 210 may determine that an uplink transmission to the base station 205 is to occur. The uplink transmission may be transmitted according to an uplink timing advance value that represents, at least in certain aspects, the amount of propagation time of the uplink transmission. The propagation time may generally refer to the amount of time that the uplink transmission takes from transmission from relay UE 210 to reception at base station 205.

The relay UE 210 and base station 205, however, may not perform a timing advance procedure that identifies the uplink timing advance value. In some examples, the base station 205 may transmit a signal to the relay UEs 210 indicating a set of available uplink timing advance values that the relay UE 210 can use for the uplink transmission. The set of available uplink timing advance values may include absolute (e.g., fixed times) and/or relative (e.g., with reference to a common time) timing values by which the relay UEs 210 can transmit the uplink transmission such that it is received at the scheduled uplink transmission time at the base station 205. However, the relay UEs 210 may use the set of available uplink timing advance values as a starting point and may perform the open-loop adjustment to identify an adjusted uplink timing advance value.

In some aspects, the relay UE 210 may perform the open-loop adjustment based on a distance between the relay UE 210 and the base station 205. The distance may refer to the physical distance (e.g., based on satellite positioning system (SPS) location information), based on an angular distance, how far the relay UE 210 has to travel to the base station 205, a RTT associated with an uplink transmission to the base station 205, and the like.

A SPS may be used to determine positioning coordinates, referred to herein as SPS coordinates. The SPS may use signals from regional and/or global satellite systems. Global systems include the Global Positioning System (GPS), Galileo, GLONASS, or the like. Regional satellite navigation systems include, for example, Quasi-Zenith Satellite System (QZSS) over Japan, Indian Regional Navigational Satellite System (IRNSS) over India, Beidou/Compass over China, etc., and/or various augmentation systems (e.g., an Satellite Based Augmentation System (SBAS)) that may be associated with or otherwise enabled for use with one or more global and/or regional navigation satellite systems. It should be noted that claimed subject matter is not limited to the use of space vehicles such as those space vehicles of the aforementioned global or regional satellite navigation systems.

In some aspects, the angular distance may refer to a beam configuration used for the uplink transmission to the base station 205 and/or associated with a recent downlink transmission from the base station 205. For example, the beam configuration may include a beam index that identifies the beam. Based on the relay UE 210 identifying the beam, the relay UE 210 may also know an associated departure angle, arrival angle, etc., associated with the beam. The relay UE 210 may use the angular distance to determine the distance between the relay UE 210 and the base station 205.

Accordingly, the relay UE 210 may autonomously determine the adjusted uplink timing advance value. The relay UE 210 may then transmit the uplink transmission according to the adjusted uplink timing advance value so that base station 205 may receive the uplink transmission as scheduled.

In some aspects, adjusted uplink timing advance values may be determined by relay UE 210 with no/minimal indication from the base station 205. In some aspects, a semi-persistent open-loop timing advance procedure may include base station 205 initially providing a "sequence" of timing advance values. This may be, for example, based on the typical relative speed, and the initial condition (e.g., the configuration used for the initial communication). Examples of the sequence of timing advance values may include, but are not limited to TA1 for T0<T<T1, TA2 for T1<T<T2, and so forth. In some aspects, the base station 205 may dynamically change/override the timing advance value in the case of anomaly.

In some aspects, base station 205 determines a "set" or a "sequence" of uplink timing advance values, e.g., such that the relay UE 210 is aware of this. It may then determine or indicate what uplink timing advance values to use. The dynamic indication may be base station centric (e.g., by base station 205) or be UE centric (e.g., by relay UE 210). The dynamic indication can be n-bit to specify which one of M values to use (M<=2^n). The dynamic indication can be 1-bit to specify changing from the current value to the next values in the configured "sequence." The set or sequence of uplink timing advance values may be absolute values or may be relative values (e.g., offset with respect to another value in the set, or the current value).

In some aspects, relay UE 210 determines the adjusted uplink timing advance value itself, e.g., not using a preconfigured set of uplink timing advance values. In this aspect, base station 205 pre-configuration may provide one or multiple timing advance commands, and the relay UE 210 may autonomously update the uplink timing advance value itself.

In some aspects, relay UE 210 may be triggered to autonomously update the uplink timing advance value. One example of a trigger may include a relative location change, e.g., there is a mapping from the location (or relative location: e.g., linear distance, or angular direction) to different uplink timing advance values. The relay UE 210 may use SPS or other positioning techniques (e.g., provided by LTE/NR). The relay UE 210 may calculate the travelled distance (e.g., based on the travelling speed and time of travel).

In some aspects, the relay UE 210 may estimate the distance thru RTT (e.g., based on a change in the downlink receive time). In a direction based scheme, each beam may be mapped to one or multiple timing advance values such that when using a beam 'b,' the corresponding timing advance value(s) may be used. If there are multiple timing advance values associated with the same beam (e.g., for the case of shallow angles), the relay UE 210 may choose the uplink timing advance value using any of: (1) location-based, (2) reference signals received power (RSRP) based (mapping from thresholds on RSRP to timing advance values), (3) indication coming from base station 205, and/or (4) change at end of some preconfigured time intervals.

Accordingly, because the UE 210 and the base stations 205 transmit and receive signals without uplink timing control and using updated timing advance values, valuable resources are not wasted on a timing advance procedure. Timing advance procedures require the base station 205 and the UE 210 to exchange timing measurement signals, timing commands, etc. The implementations described herein allow for the UE 210 and the base station 205 to avoid the processing, compute, and other resource overhead associated with the timing advance procedure. Furthermore, timing advance procedures may not be suitable to high mobility environments described herein, and the implementations described herein provide for resource efficient communications between UEs 210 and base stations 205 in high mobility environments.

Figure 3A:
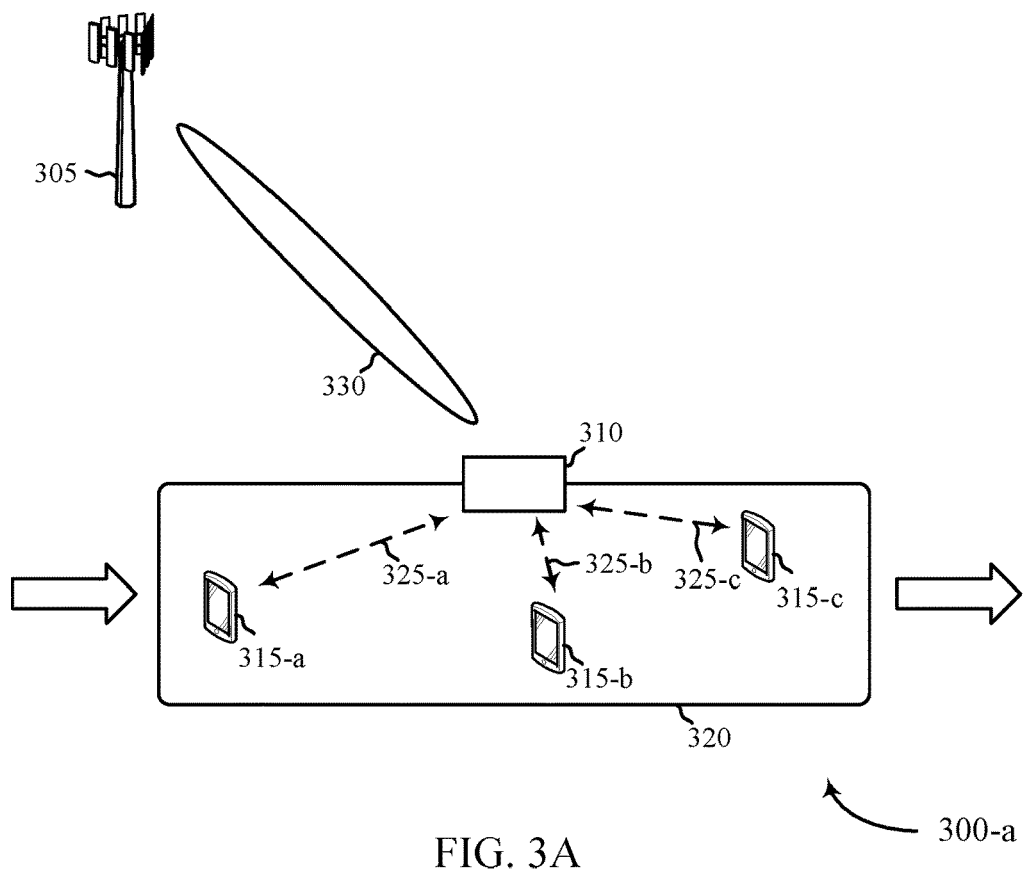
FIGS. 3A and 3B illustrate examples of aspects of a system for wireless communication and timing that support open loop uplink timing advance in accordance with aspects of the present disclosure.
Figure 3B:
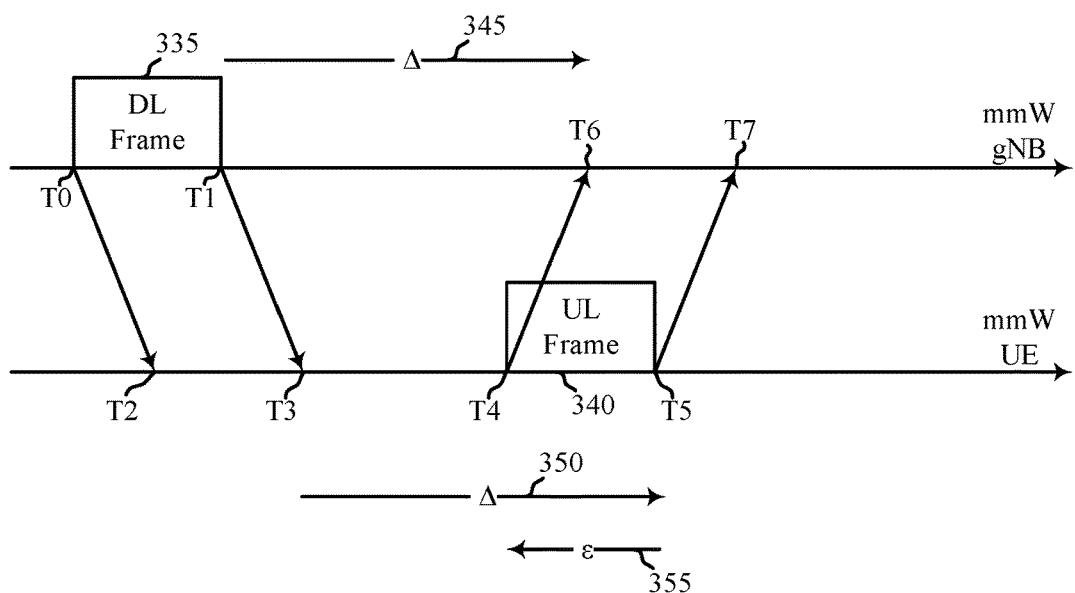

FIGS. 3A and 3B illustrate examples of aspects of a system for wireless communications that supports open loop uplink timing advance in accordance with various aspects of the present disclosure. More particularly, FIG. 3A illustrates an example of a wireless communications system 300-a, and FIG. 3B illustrates an example of a timing diagram 300-b for wireless communications system 300-a. In some examples, wireless communications system 300-a may implement aspects of wireless communications systems 100/200. Wireless communications system 300-a may include a base station 305, a relay UE 310, and UEs 315, which may be examples of the corresponding devices described herein.

Generally, wireless communications system 300-a illustrates an example where relay UE 310 is located farther from base station 305.

Generally, base station 305 and relay UE 310 may communicate using beamformed signal 330. As discussed with respect to wireless communications system 200, relay UE 310 may be mounted in vehicle 320, which may be an example of an automobile, a train, a bus, a plane, a ship, etc. UEs 315 may be positioned within vehicle 320 and relay UE 310 may provide a link between UEs 315 and base station 305. UEs 315 may communicate with relay UE 310 using wireless links 325, e.g., cellular wireless links, Wi-Fi wireless links, Bluetooth wireless links, and the like. Base station 305 may be connected to a core network directly and/or via a wireless link to another base station, such as shown in FIG. 2.

In some aspects, vehicle 320 may be mobile and move along the direction indicated by the arrows. Accordingly, the position of relay UE 310 with respect to base station 305 may change over time. As the position and/or orientation of vehicle 320 (and relay UE 310 by extension) changes, the beam configuration used for communications between base station 305 and relay UE 310 may also change. For example, and as is shown in FIG. 3A, the beam configuration of beamformed signal 330 may have a relatively longer propagation time, may have a higher angle of departure, may have a higher beam transmit power, and the like.

In some aspects, relay UE 310 may be configured to autonomously determine an uplink timing advance value to use for an uplink transmission. In some aspects, relay UE 310 may use the distance (e.g., based on SPS coordinates) between the relay UE 310 and the base station 305 to perform the open-loop adjustment to adjust the uplink timing advance value. For example, the relay UE 310 may be equipped with SPS functionality such that the coordinates of the relay UE 310 may be known in real time. The relay UE 310 may know, e.g., a priori, the coordinates of fixed mounted base station 305. Accordingly, the relay UE 310 may use the coordinates of the relay UE 310 and the coordinates of the base station 305 to determine the distance between the two devices. Based on the distance and the propagation time for an uplink transmission, the relay UE 310 may perform the open-loop (e.g., without being instructed to do so and/or how to do so) adjustment to determine the adjusted uplink timing advance value.

Figure 4A:
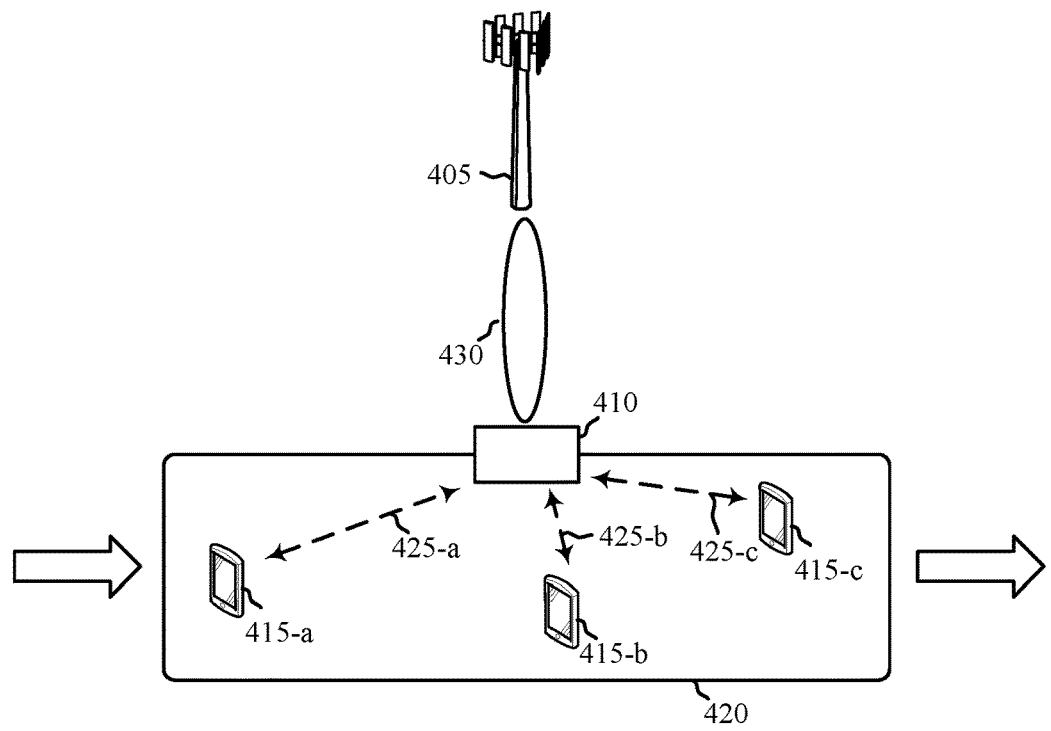
FIGS. 4A and 4B illustrate examples of aspects of a system for wireless communication and timing that support open loop uplink timing advance in accordance with aspects of the present disclosure.

Additionally or alternatively, the relay UE 310 may use beam information (e.g., beam configuration information) to perform the open-loop adjustment to adjust the uplink timing advance value. Generally, beam configurations corresponding to a bore-sight (e.g., when relay UE 310 and base station 305 are close, as is shown in FIG. 4A) will have a relatively shorter propagation time than beam configurations corresponding to end-fire (e.g., when relay UE 310 and base station 305 are farther apart, as is shown in FIG. 3A). That is, relay UE 310 being located close to base station 305 may have an associated propagation time that is shorter than when relay UE 310 is farther away from base station 305. In some aspects, the beam configuration may include a beam index where each beam index is associated with a particular beam direction, a beam shape, a beam transmit power, a beam departure angle, and the like. Accordingly, in some aspects the beam index used for beamformed communications between relay UE 310 and base station 305 may provide an indication of the beam angle, which in turn provides an indication of the distance between relay UE 310 and base station 305.

The relay UE 310 may use the distance information to perform the open-loop adjustment in order to identify the adjusted uplink timing advance value. In some aspects, the uplink transmission may be scheduled for relay UE 310. The adjusted uplink timing advance value may provide an uplink timing advance value that ensures the base station 305 receives the uplink transmission according to the uplink transmission schedule.

As one example and with reference to timing diagram 300-b, the base station 305 may transmit a downlink frame 335. The base station 305 may begin transmitting downlink frame 335 at time T0 and complete the transmission at time T1. However, there may be a propagation delay between the base station 305 and the relay UE 310 such that the downlink frame 335 is received at the relay UE 310 beginning at time T2 and ending at time T3.

In some aspects, the base station may identify a time gap 345 associated with a difference between the end of the downlink frame 335 and the receipt of an uplink frame 340. Generally, the base station 305 may have scheduled receipt of the uplink frame 340 at the end of the time gap 345.

The relay UE 310 may identify a time gap 350 that is also associated with a difference between the receiving downlink frame 335 and transmitting uplink frame 340. However, relay UE 310 may also identify an adjusted uplink timing advance value 355 that represents an uplink timing advance value that the relay UE 310 will adjust the uplink transmission in order for the base station 305 to receive the uplink frame 340 at the end of the time gap 345, e.g., according to the uplink transmission schedule. That is, were the uplink frame 340 transmitted at the end of the time gap 350, the uplink frame 340 would arrive late due to propagation delays, etc. As the distance from the relay UE 310 and the base station 305 determine, at least to some degree, the propagation delay, the size of the adjusted uplink timing advance value 355 will change. As is illustrated in timing diagram 300-b, the relay UE 310 and base station 305 are farther apart and therefore the adjusted uplink timing advance value 355 is large. The relay UE 310 may begin transmitting uplink frame 340 at time T4 and complete the transmission at time T5. However, there may be a propagation delay between the base station 305 and the relay UE 310 such that the uplink frame 340 is received at the base station 305 beginning at time T6 and ending at time T7. As time T6 corresponds to the end of the time gap 345, the adjusted uplink timing advance value 355 corrects the transmission time of the uplink frame 340 according to the uplink schedule.

Accordingly, the relay UE 310 may autonomously calculate the adjusted uplink timing advance value 355 in order to transmit uplink frame 340 at a time that complies with the uplink transmission schedule. As the described techniques omit the conventional timing advance procedure, relay UE 310 may transmit (and base station 305 may receive) the uplink frame 340 without first applying the conventional timing advance procedure in connection with the uplink message, which can utilize significant resources.

Figure 4B:
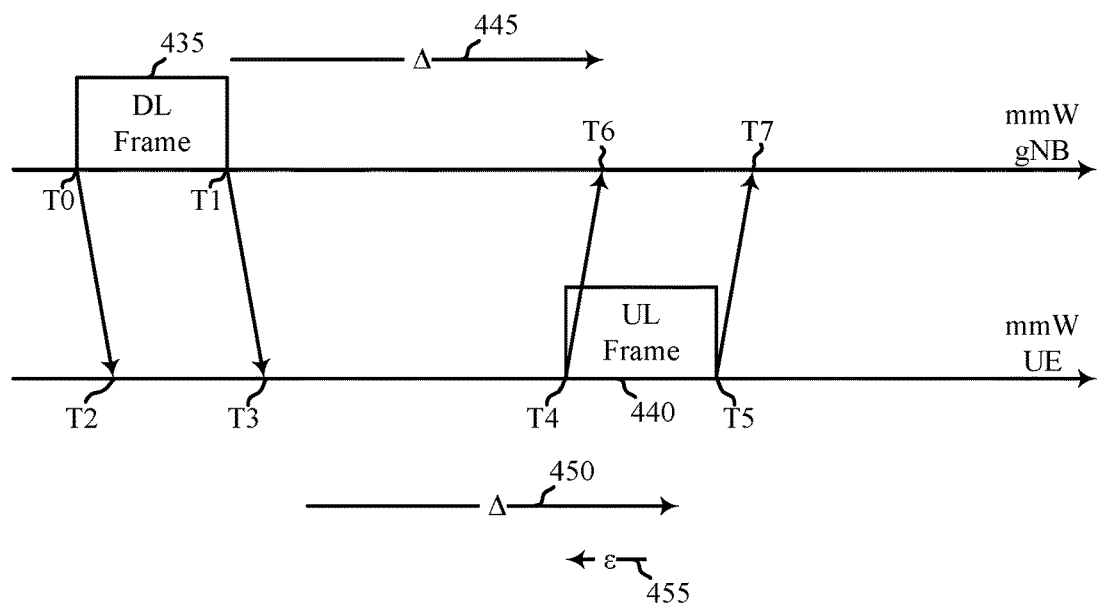

FIGS. 4A and 4B illustrate examples of a wireless communications system that supports open loop uplink timing advance in accordance with various aspects of the present disclosure. More particularly, FIG. 4A illustrates an example of a wireless communications system 400-a and FIG. 4B illustrates an example of a timing diagram 400-b for wireless communications system 400-a. In some examples, wireless communications system 400-a may implement aspects of wireless communications systems 100/200/300. Wireless communications system 400-a may include a base station 405, a relay UE 410, and UEs 415, which may be examples of the corresponding devices described herein. Generally, wireless communications system 400-a illustrates an example where relay UE 410 is located close to base station 405.

Generally, base station 405 and relay UE 410 may communicate using beamformed signal 430. As discussed with respect to wireless communications system 200, relay UE 410 may be mounted in vehicle 420, which may be an example of an automobile, a train, a bus, a plane, a ship, etc. UEs 415 may be positioned within vehicle 420 and relay UE 410 may provide a link between UEs 415 and base station 405. UEs 415 may communicate with relay UE 410 using wireless links 425, e.g., cellular wireless links, Wi-Fi wireless links, Bluetooth wireless links, and the like. Base station 405 may be connected to a core network directly and/or via a wireless link to another base station, such as shown in FIG. 2.

In some aspects, vehicle 420 may be mobile and move along the direction indicated by the arrows. Accordingly, the position of relay UE 410 with respect to base station 405 may change over time. As the position and/or orientation of vehicle 420 (and relay UE 410 by extension) changes, the beam configuration used for communications between base station 405 and relay UE 410 may also change. For example, and as is show in FIG. 4A, the beam configuration of beamformed signal 430 may have a relatively smaller propagation time, may have a lower angle of departure, may have a lower beam transmit power, and the like.

In some aspects, relay UE 410 may be configured to autonomously determine an uplink timing advance value to use for an uplink transmission. In some aspects, relay UE 410 may use the distance (e.g., based on SPS coordinates) between the relay UE 410 and the base station 405 to perform the open-loop adjustment to adjust the uplink timing advance value. For example, the relay UE 410 may be equipped with SPS functionality such that the coordinates of the relay UE 410 may be known in real time. The relay UE 410 may know, e.g., a priori, the coordinates of fixed mounted base station 405. Accordingly, the relay UE 410 may use the coordinates of the relay UE 410 and the coordinates of the base station 405 to determine the distance between the two devices. Based on the distance and the propagation time for an uplink transmission, the relay UE 410 may perform the open-loop (e.g., without being instructed to do so and/or how to do so) adjustment to determine the adjusted uplink timing advance value.

Additionally or alternatively, the relay UE 410 may use beam information (e.g., beam configuration information) to perform the open-loop adjustment to adjust the uplink timing advance value. Generally, beam configurations corresponding to a bore-sight (e.g., when relay UE 410 and base station 405 are close, as is shown in FIG. 4A) will have a relatively shorter propagation time than beam configurations corresponding to end-fire (e.g., when relay UE 410 and base station 405 are farther apart, as is shown in FIG. 3A). That is, relay UE 410 being located close to base station 405 may have an associated propagation time that is shorter than when relay UE 410 is farther away from base station 405. In some aspects, the beam configuration may include a beam index where each beam index is associated with a particular beam direction, a beam shape, a beam transmit power, a beam departure angle, and the like. Accordingly, in some aspects the beam index used for beamformed communications between relay UE 410 and base station 405 may provide an indication of the beam angle, which in turn provides an indication of the distance between relay UE 410 and base station 405.

The relay UE 410 may use the distance information to perform the open-loop adjustment in order to identify the adjusted uplink timing advance value. In some aspects, the uplink transmission may be scheduled for relay UE 410. The adjusted uplink timing advance value may provide an uplink timing advance value that ensures the base station 405 receives the uplink transmission according to the uplink transmission schedule.

As one example and with reference to timing diagram 400-b, the base station 405 may transmit a downlink frame 435. The base station 405 may begin transmitting downlink frame 435 at time T0 and complete the transmission at time T1. However, there may be a propagation delay between the base station 405 and the relay UE 410 such that the downlink frame 435 is received at the relay UE 410 beginning at time T2 and ending at time T3.

In some aspects, the base station 405 may identify a time gap 445 associated with a difference between the end of the downlink frame 435 and the receipt of an uplink frame 440. Generally, the base station 405 may have scheduled receipt of the uplink frame 440 at the end of the time gap 445.

The relay UE 410 may identify a time gap 450 that is also associated with a difference between the receiving downlink frame 435 and transmitting uplink frame 440. However, relay UE 410 may also identify an adjusted uplink timing advance value 455 that represents an uplink timing advance value that the relay UE 410 will adjust the uplink transmission in order for the base station 405 to receive the uplink frame 440 at the end of the time gap 445, e.g., according to the uplink transmission schedule. That is, were the uplink frame 440 transmitted at the end of the time gap 445, the uplink frame 440 would arrive late due to propagation delays, etc. As the distance from the relay UE 410 and the base station 405 determine, at least to some degree, the propagation delay, the size of the adjusted uplink timing advance value 455 will change. As is illustrated in timing diagram 400-b, the relay UE 410 and base station 405 are located close and therefore the adjusted uplink timing advance value 455 is small. The relay UE 410 may begin transmitting uplink frame 440 at time T4 and complete the transmission at time T5. However, there may be a propagation delay between the base station 405 and the relay UE 410 such that the uplink frame 440 is received at the base station 405 beginning at time T6 and ending at time T7. As time T6 corresponds to the end of the time gap 445, the adjusted uplink timing advance value 455 corrects the transmission time of the uplink frame 440 according to the uplink schedule.

Accordingly, the relay UE 410 may autonomously calculate the adjusted uplink timing advance value 455 in order to transmit uplink frame 440 at a time that complies with the uplink transmission schedule. As the described techniques omit the conventional timing advance procedure, relay UE 410 may transmit (and base station 405 may receive) the uplink frame 440 without first applying the conventional timing advance procedure in connection with the uplink message.

Figure 5:
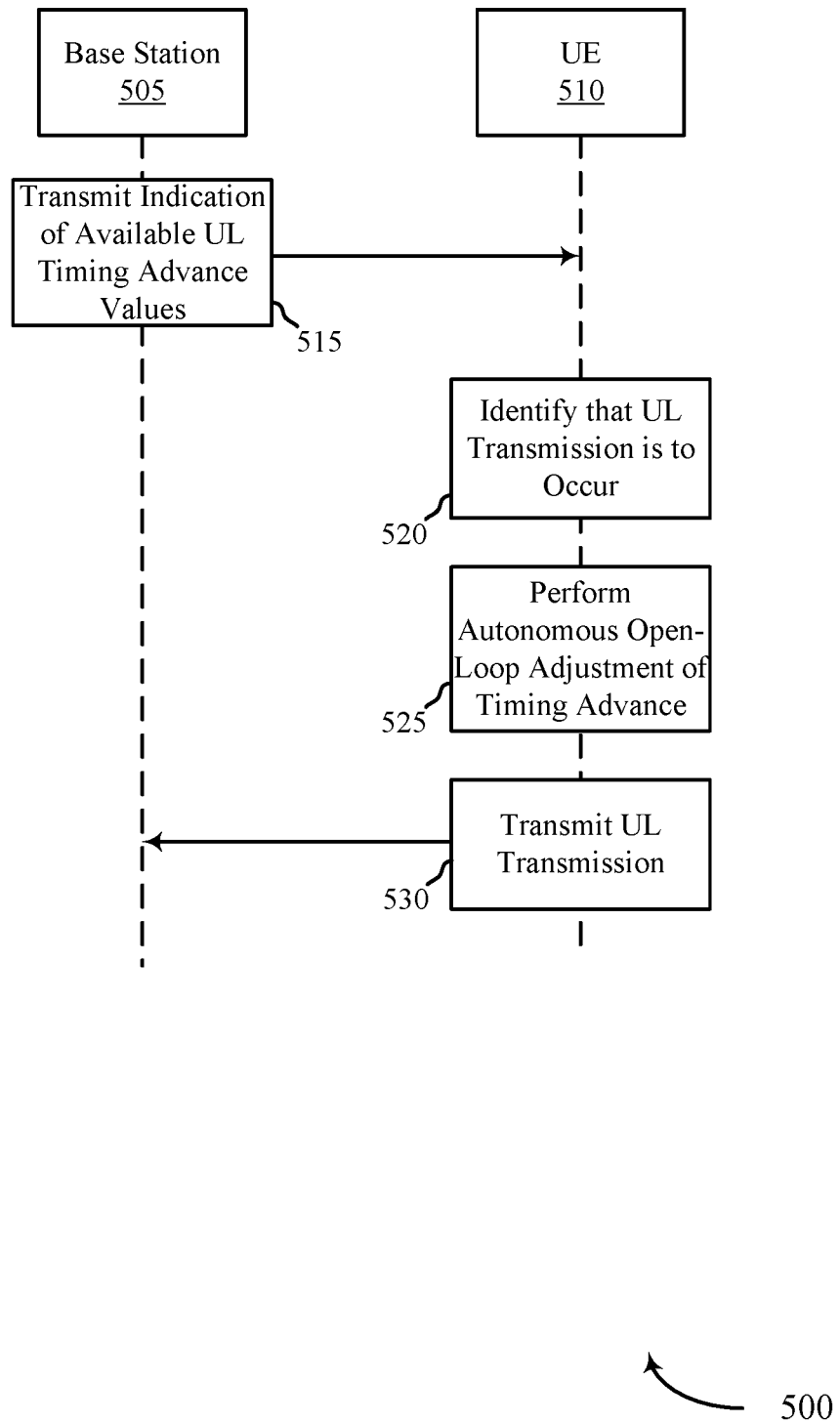
FIG. 5 illustrates an example of a process that supports open loop uplink timing advance in accordance with aspects of the present disclosure.

FIG. 5 illustrates an example of a process 500 that supports open loop uplink timing advance in accordance with various aspects of the present disclosure. In some examples, process 500 may implement aspects of wireless communications systems 100/200/300/400. Process 500 may include a base station 505 and a UE 510 (e.g., a relay UE), which may be examples of the corresponding devices described herein.

At 515, base station 505 may transmit (and UE 510 may receive) an indication of a set of available uplink timing advance values. The set of uplink timing advance values may be for UE 510 to use for uplink transmissions. Each uplink timing advance value may be associated with or otherwise represent an amount of time that an uplink transmission is expected to take from transmission at the UE 510 to reception at the base station 505. The set of uplink timing advance values may be absolute uplink timing advance values and/or relative uplink timing advance values.

At 520, UE 510 may identify that an uplink transmission to base station 505 is to occur. The uplink transmission may occur in accordance with an uplink timing advance value that represents an amount of time that an uplink transmission is expected to take from transmission at the UE 510 to reception at the base station 505.

At 525, UE 510 may perform autonomous open-loop adjustment to the uplink timing advance value. UE 510 may calculate a distance between the UE 510 and the base station 505 and use the distance when performing the open-loop adjustment to adjust the uplink timing advance value. For example, UE 510 may use SPS coordinates of the UE 510 and the base station 505 to calculate the distance. In some aspects, the distance may refer to any of a physical distance between the UE 510 and the base station 505, or an angular distance between the UE 510 and the base station 505, or a travel distance from the UE 510 to the base station 505, or a RTT distance associated with a wireless transmission between the UE 510 and the base station 505, or any combination thereof.

In some aspects, UE 510 may determine a downlink beam configuration (e.g., beam direction, beam departure angle, beam index, and the like) for a downlink transmission from the base station 505. The uplink timing advance value may be adjusted based at least in part on the downlink beam configuration.

In some aspects, UE 510 may receive a signal from the base station 505 indicating the that the UE 510 is to use a second adjusted uplink timing advance value that is different from the adjusted uplink timing advance value.

In some aspects, UE 510 may receive an indication from the base station 505 triggering the UE 510 to perform the open-loop adjustment procedure.

At 530, UE 510 may transmit (and base station 505 may receive) an uplink transmission to the base station 505 in accordance with the adjusted uplink timing advance value.

Figure 6:
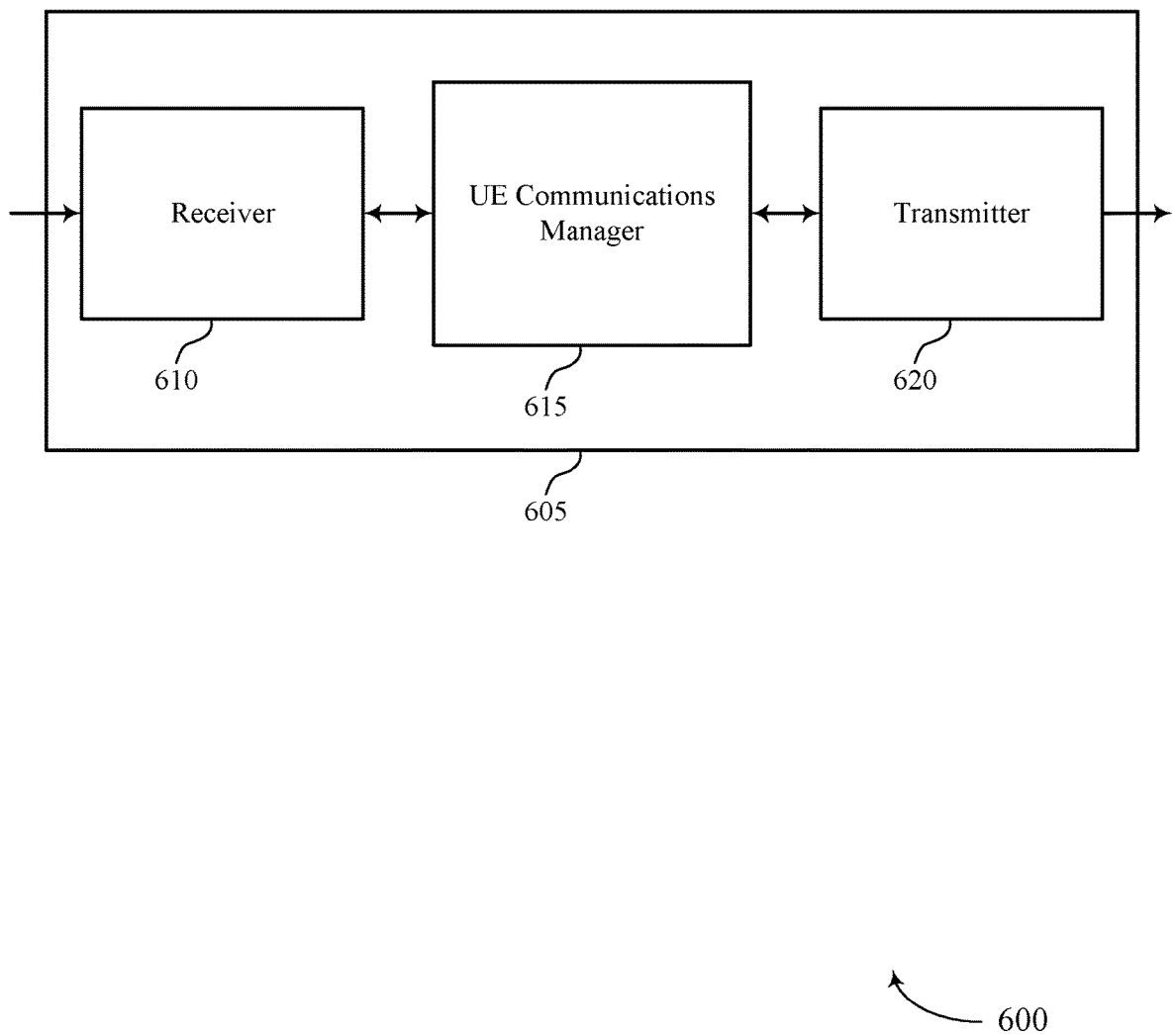
FIGS. 6 through 8 show block diagrams of a device that supports open loop uplink timing advance in accordance with aspects of the present disclosure.

FIG. 6 shows a block diagram 600 of a wireless device 605 that supports open loop uplink timing advance in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to open loop uplink timing advance, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may identify that an uplink transmission to a base station is to occur in accordance with an uplink timing advance value representing an amount of time that the uplink transmission takes from transmission at the UE to reception at the base station, perform an autonomous open-loop adjustment to the uplink timing advance value, and transmit the uplink transmission to the base station in accordance with the adjusted uplink timing advance value.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
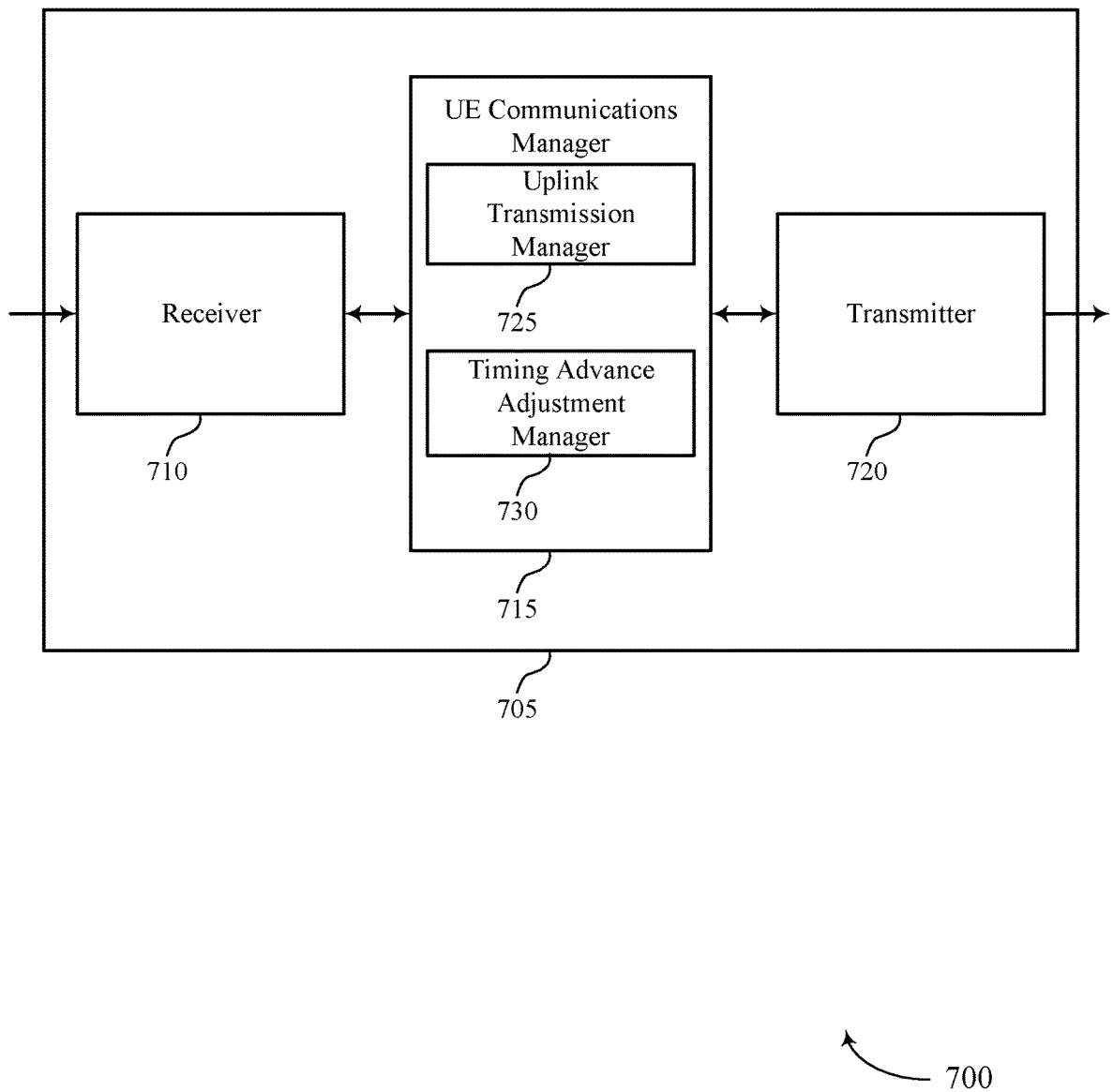

FIG. 7 shows a block diagram 700 of a wireless device 705 that supports open loop uplink timing advance in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to open loop uplink timing advance, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9.

UE communications manager 715 may also include uplink transmission manager 725 and timing advance adjustment manager 730.

Uplink transmission manager 725 may identify that an uplink transmission to a base station is to occur in accordance with an uplink timing advance value representing an amount of time that the uplink transmission takes from transmission at the UE to reception at the base station and transmit the uplink transmission to the base station in accordance with the adjusted uplink timing advance value.

Timing advance adjustment manager 730 may perform an autonomous open-loop adjustment to the uplink timing advance value.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
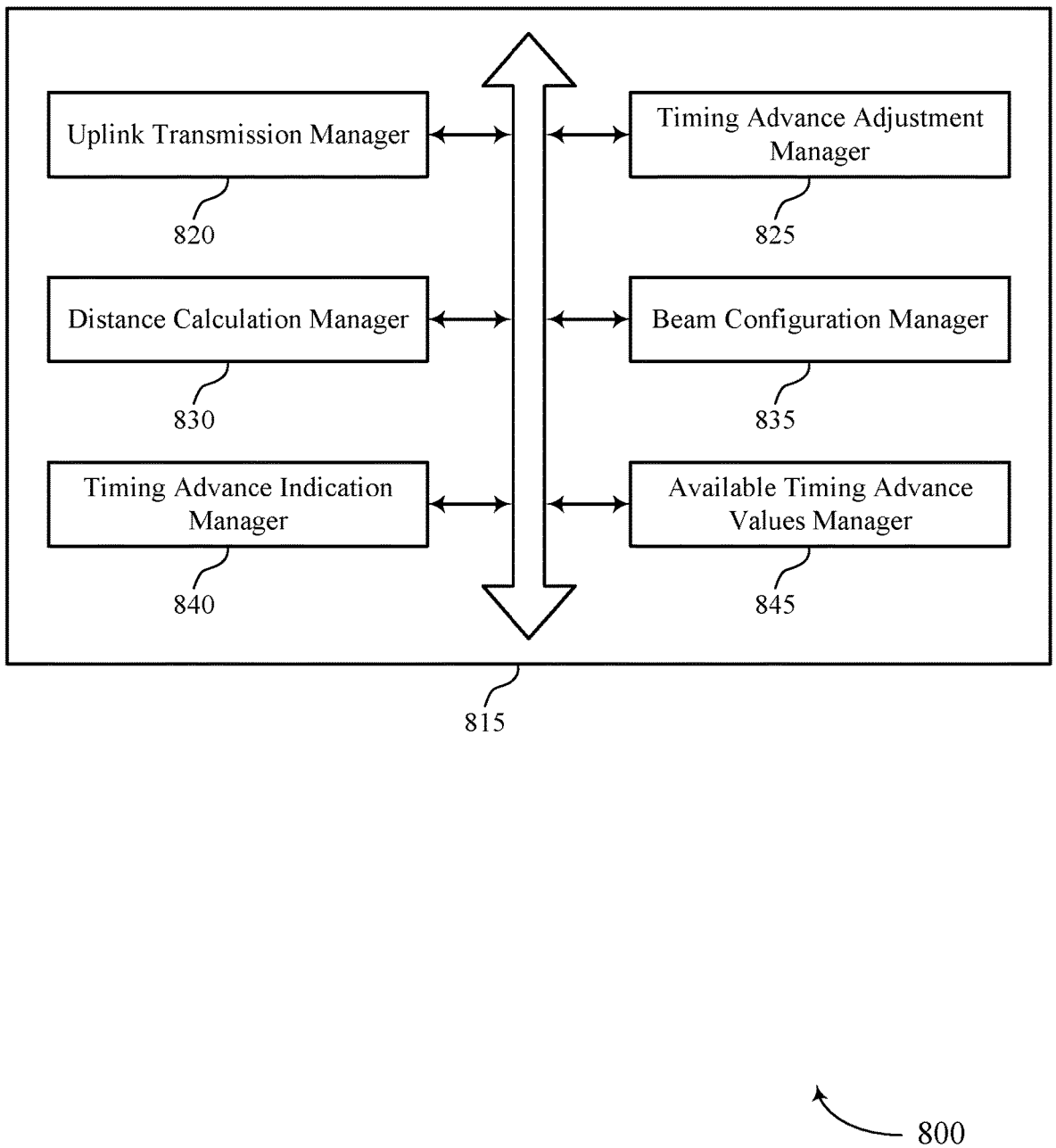

FIG. 8 shows a block diagram 800 of a UE communications manager 815 that supports open loop uplink timing advance in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include uplink transmission manager 820, timing advance adjustment manager 825, distance calculation manager 830, beam configuration manager 835, timing advance indication manager 840, and available timing advance values manager 845. Each of these modules may communicate, directly or indirectly, with one another (e.g., via one or more buses).

Uplink transmission manager 820 may identify that an uplink transmission to a base station is to occur in accordance with an uplink timing advance value representing an amount of time that the uplink transmission takes from transmission at the UE to reception at the base station and transmit the uplink transmission to the base station in accordance with the adjusted uplink timing advance value.

Timing advance adjustment manager 825 may perform an autonomous open-loop adjustment to the uplink timing advance value.

Distance calculation manager 830 may calculate a distance between the UE and the base station, where the uplink timing advance value is adjusted based on the distance and identify a SPS coordinate of the UE and a SPS coordinate of the base station, where the distance is calculated based on the SPS coordinates. In some cases, the distance includes at least one of a physical distance between the UE and the base station, or an angular distance between the UE and the base station, or a travel distance from the UE to the base station, or a RTT distance associated with a wireless transmission between the UE and the base station, or a combination thereof.

Beam configuration manager 835 may determine a downlink beam configuration for a downlink transmission from the base station, where the uplink timing advance value is adjusted based on the downlink beam configuration. In some cases, the downlink beam configuration is mapped to one or more uplink timing advance values of a set of available uplink timing advance values. In some cases, the downlink beam configuration includes at least one of a downlink beam direction, or a downlink beam index, or a downlink beam departure angle, or a combination thereof.

Timing advance indication manager 840 may receive a signal from the base station indicating the that the UE is to use a second adjusted uplink timing advance value, the second uplink adjusted uplink timing advance value being different from the adjusted uplink timing advance value.

Available timing advance values manager 845 may receive a signal from the base station indicating a set of available uplink timing advance values, where the uplink timing advance value is identified from the set of available uplink timing advance values and receive an indication from the base station triggering the UE to perform the open-loop adjustment procedure based on the set of available uplink timing advance values. In some cases, the adjusted uplink timing advance value is identified from the set of available uplink timing advance values.

Figure 9:
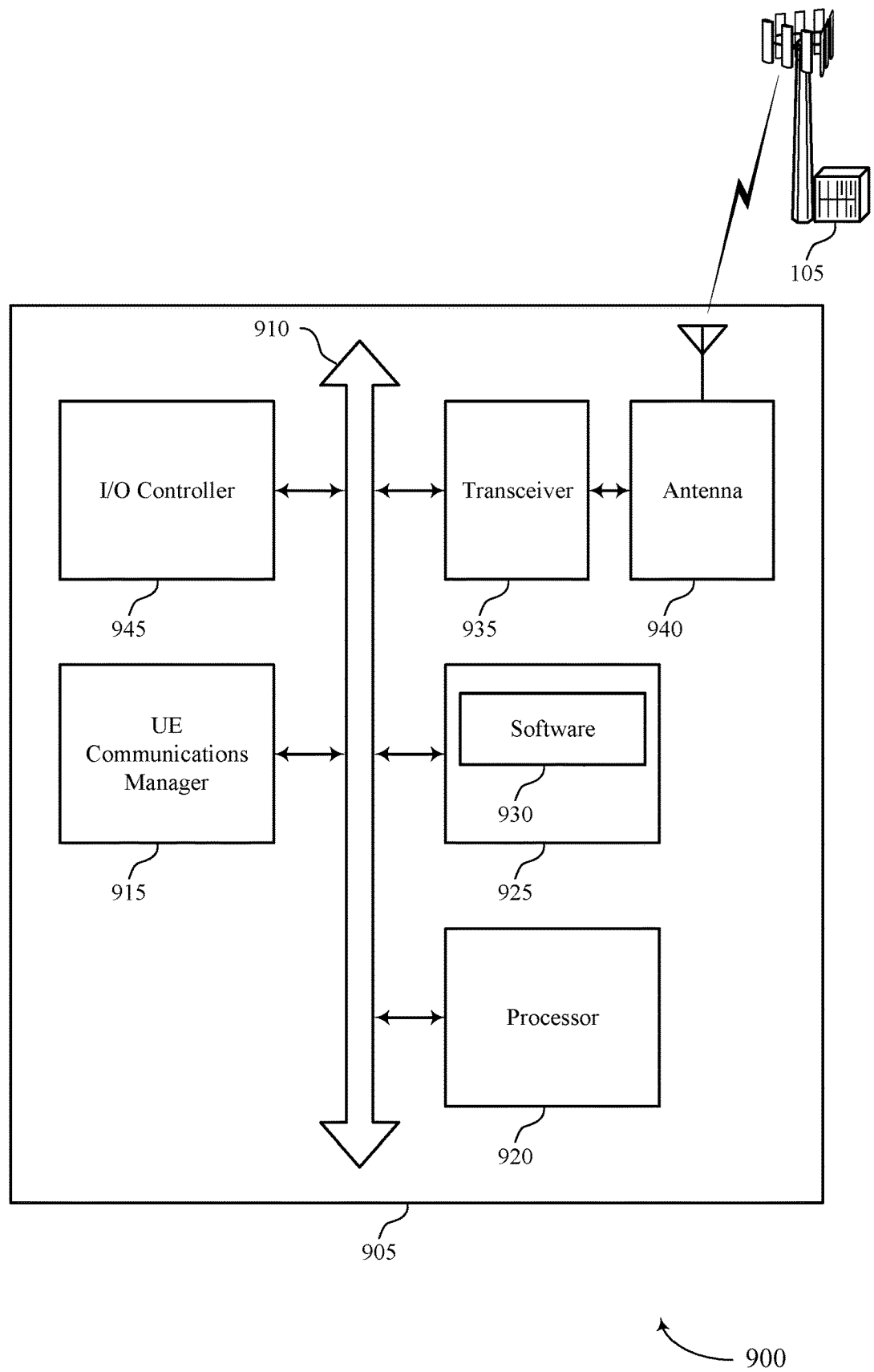
FIG. 9 illustrates a block diagram of a system including a UE that supports open loop uplink timing advance in accordance with aspects of the present disclosure.

FIG. 9 shows a diagram of a system 900 including a device 905 that supports open loop uplink timing advance in accordance with aspects of the present disclosure. Device 905 may be an example of or include the components of wireless device 605, wireless device 705, or a UE 115 as described herein, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting open loop uplink timing advance).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support open loop uplink timing advance. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
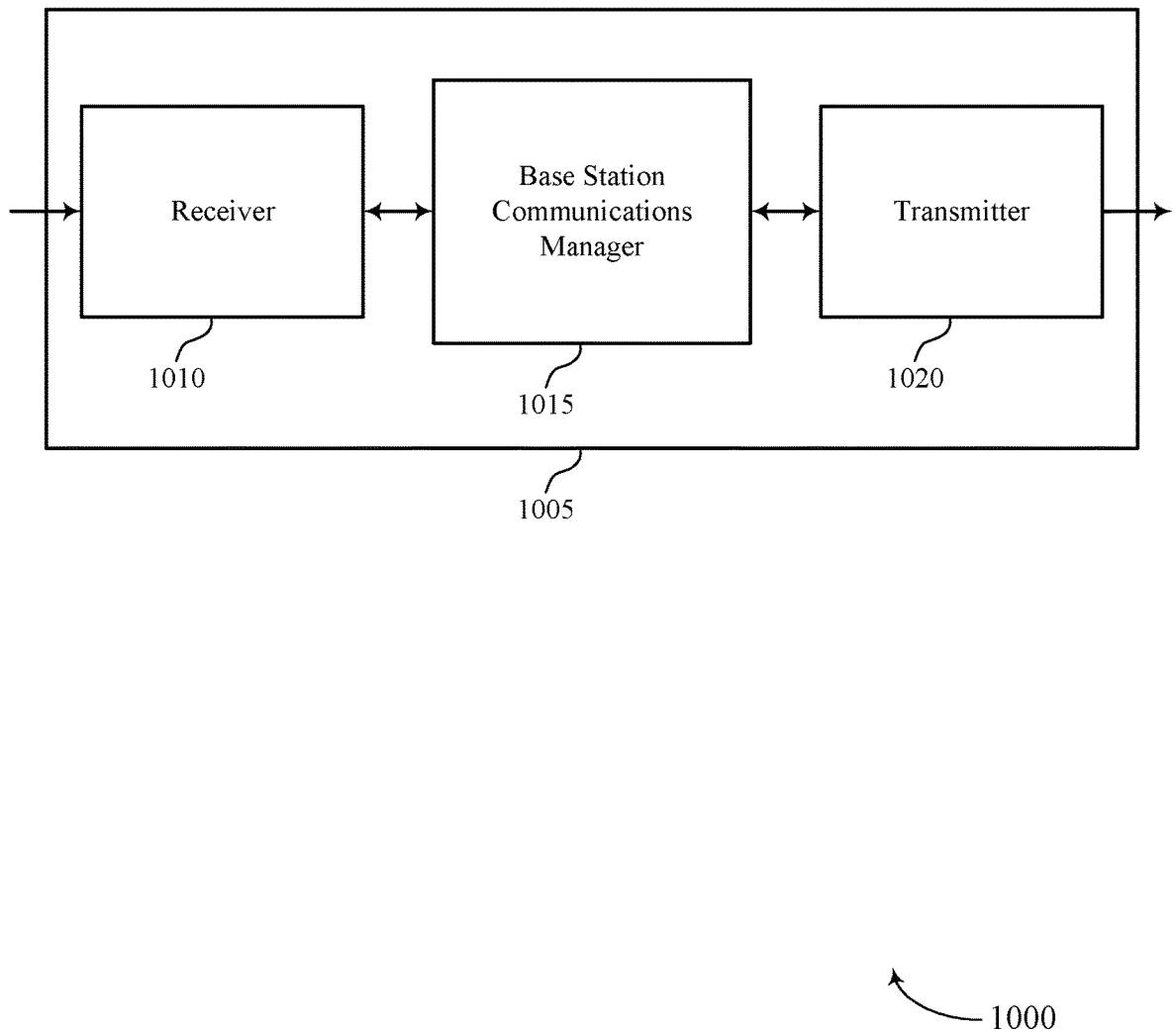
FIGS. 10 through 12 show block diagrams of a device that supports open loop uplink timing advance in accordance with aspects of the present disclosure.

FIG. 10 shows a block diagram 1000 of a wireless device 1005 that supports open loop uplink timing advance in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to open loop uplink timing advance, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may transmit an indication of a set of uplink timing advance values for a UE to use for uplink transmissions, each of the set of uplink timing advance values representing an amount of time that an uplink transmission is expected to take from transmission at the UE to reception at the base station and receive an uplink transmission from the UE in accordance with an adjusted uplink timing advance value, where the UE adjusts the uplink timing advance value in accordance with an autonomous open-loop adjustment.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
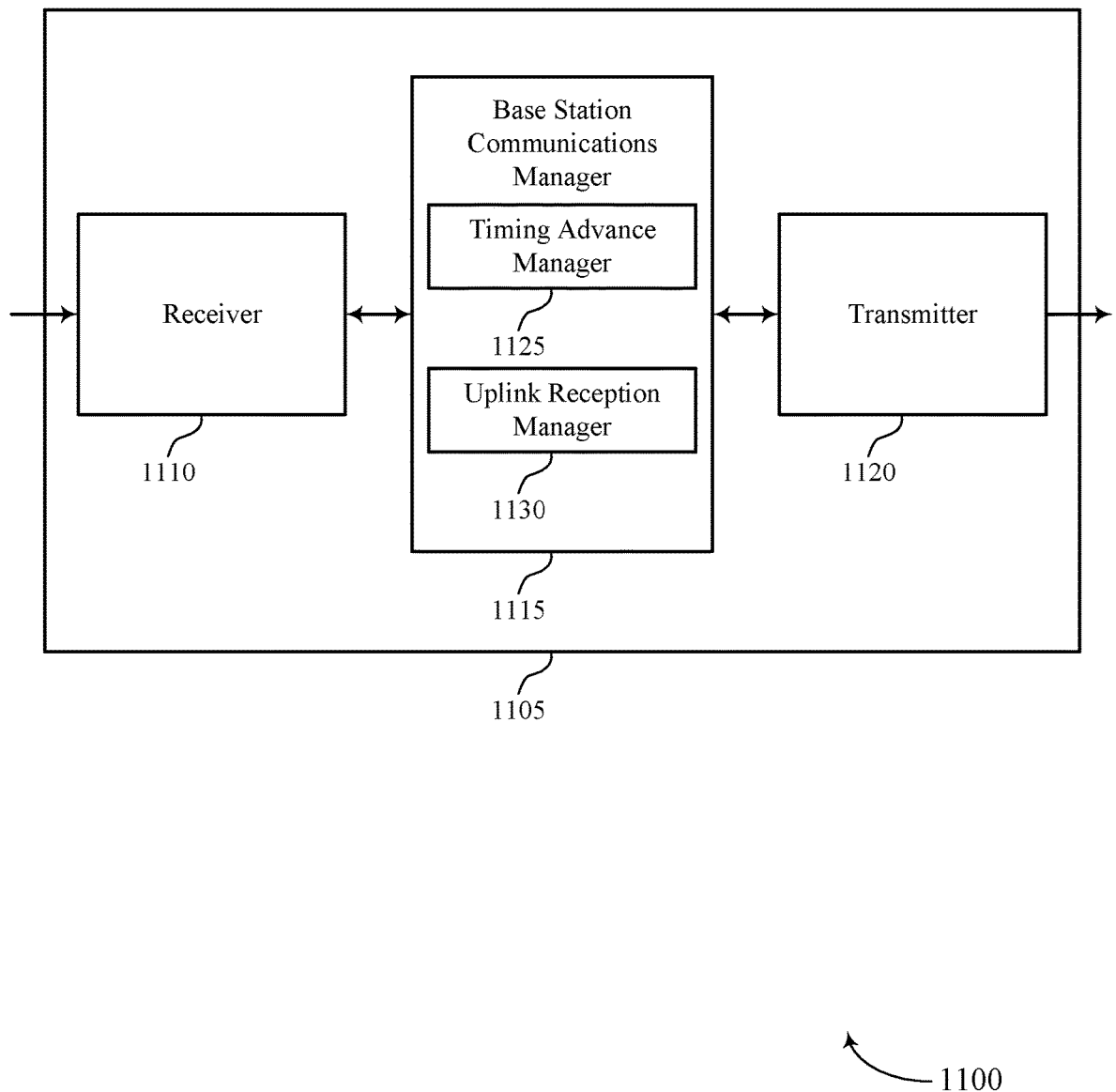

FIG. 11 shows a block diagram 1100 of a wireless device 1105 that supports open loop uplink timing advance in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to open loop uplink timing advance, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13.

Base station communications manager 1115 may also include timing advance manager 1125 and uplink reception manager 1130.

Timing advance manager 1125 may transmit an indication of a set of uplink timing advance values for a UE to use for uplink transmissions, each of the set of uplink timing advance values representing an amount of time that an uplink transmission is expected to take from transmission at the UE to reception at the base station. In some cases, the set of uplink timing advance values include at least one of a set of absolute uplink timing advance values, or a set of relative uplink timing advance values with respect to a reference time, or a combination thereof.

Uplink reception manager 1130 may receive an uplink transmission from the UE in accordance with an adjusted uplink timing advance value, where the UE adjusts the uplink timing advance value in accordance with an autonomous open-loop adjustment.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
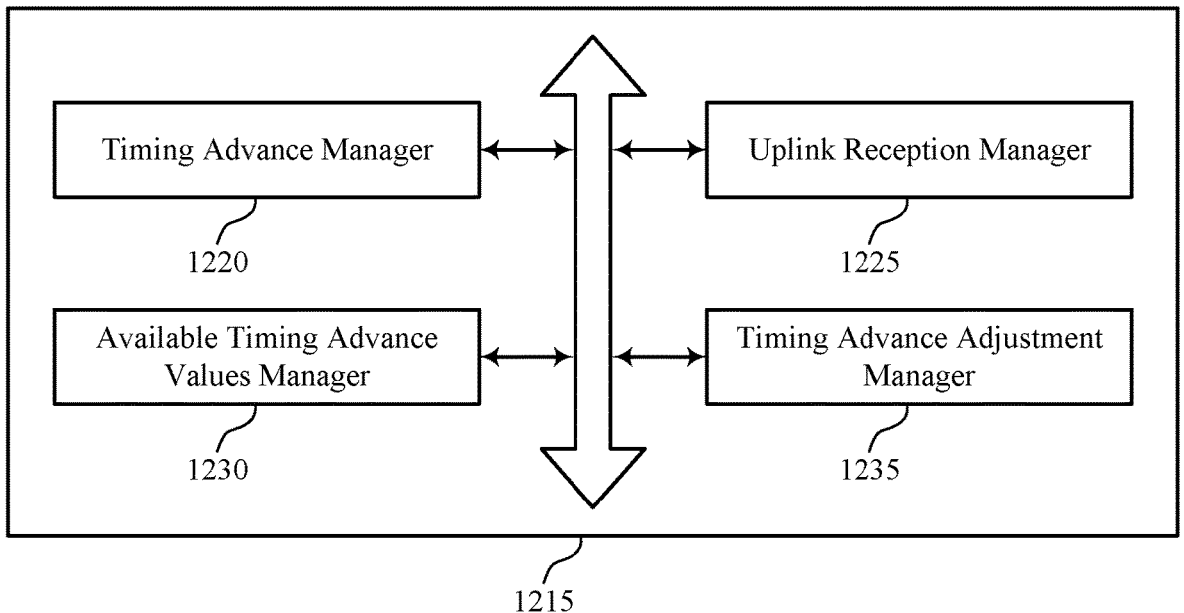

FIG. 12 shows a block diagram 1200 of a base station communications manager 1215 that supports open loop uplink timing advance in accordance with aspects of the present disclosure. The base station communications manager 1215 may be an example of aspects of a base station communications manager 1315 described with reference to FIGS. 10, 11, and 13. The base station communications manager 1215 may include timing advance manager 1220, uplink reception manager 1225, available timing advance values manager 1230, and timing advance adjustment manager 1235. Each of these modules may communicate, directly or indirectly, with one another (e.g., via one or more buses).

Timing advance manager 1220 may transmit an indication of a set of uplink timing advance values for a UE to use for uplink transmissions, each of the set of uplink timing advance values representing an amount of time that an uplink transmission is expected to take from transmission at the UE to reception at the base station. In some cases, the set of uplink timing advance values include at least one of a set of absolute uplink timing advance values, or a set of relative uplink timing advance values with respect to a reference time, or a combination thereof.

Uplink reception manager 1225 may receive an uplink transmission from the UE in accordance with an adjusted uplink timing advance value, where the UE adjusts the uplink timing advance value in accordance with an autonomous open-loop adjustment.

Available timing advance values manager 1230 may manage aspects of the adjusted uplink timing advance value being from the set of uplink timing advance values.

Timing advance adjustment manager 1235 may manage aspects of the adjusted uplink timing advance value being different from the uplink timing advance values of the set of uplink timing advance values. In some cases, the autonomous open-loop adjustment is based on at least one of a distance between the UE and the base station, or a downlink beam configuration associated with a downlink transmission from the base station, or a combination thereof.

Figure 13:
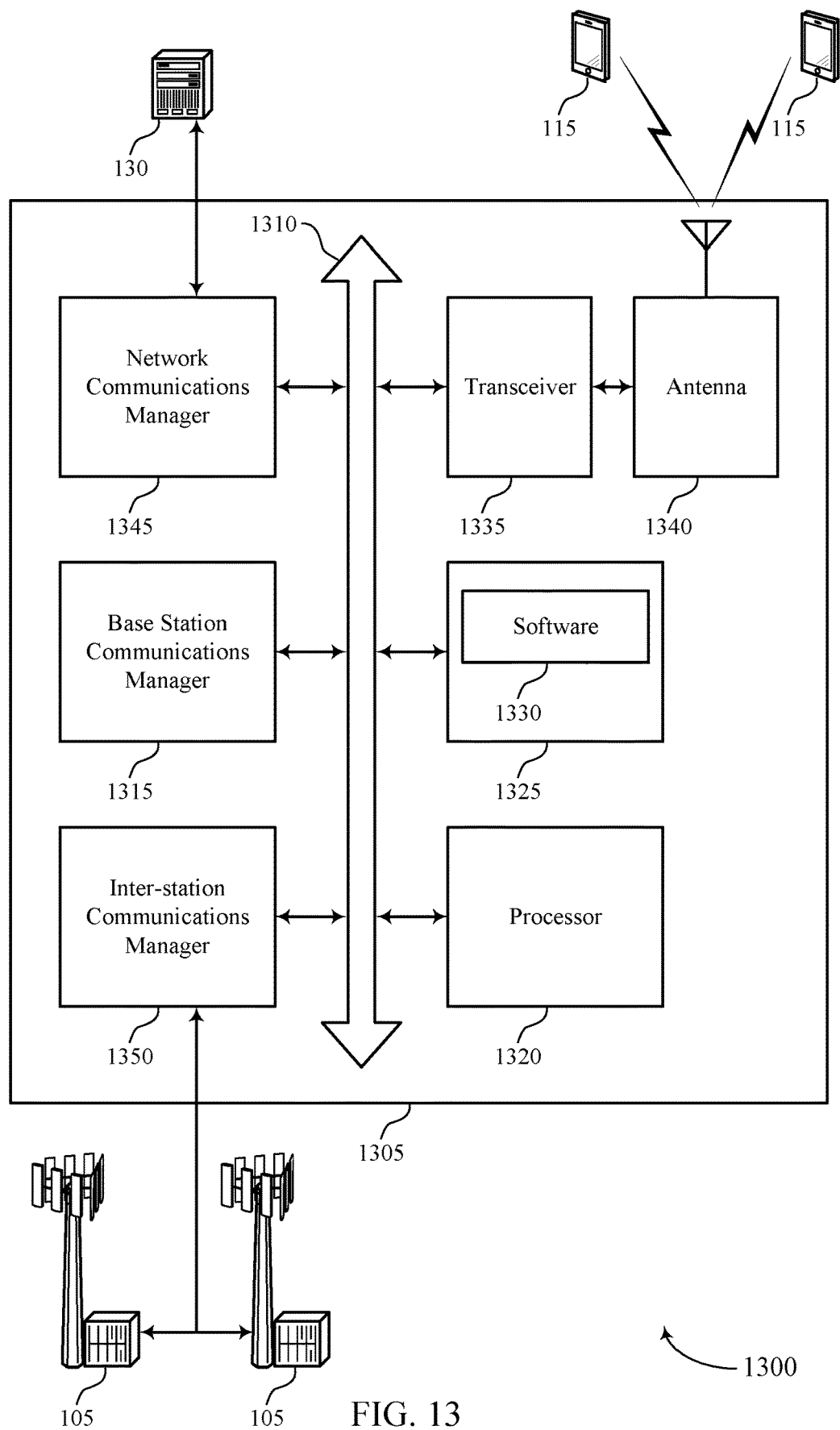
FIG. 13 illustrates a block diagram of a system including a base station that supports open loop uplink timing advance in accordance with aspects of the present disclosure.

FIG. 13 shows a diagram of a system 1300 including a device 1305 that supports open loop uplink timing advance in accordance with aspects of the present disclosure. Device 1305 may be an example of or include the components of base station 105 as described herein, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting open loop uplink timing advance).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support open loop uplink timing advance. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described herein. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
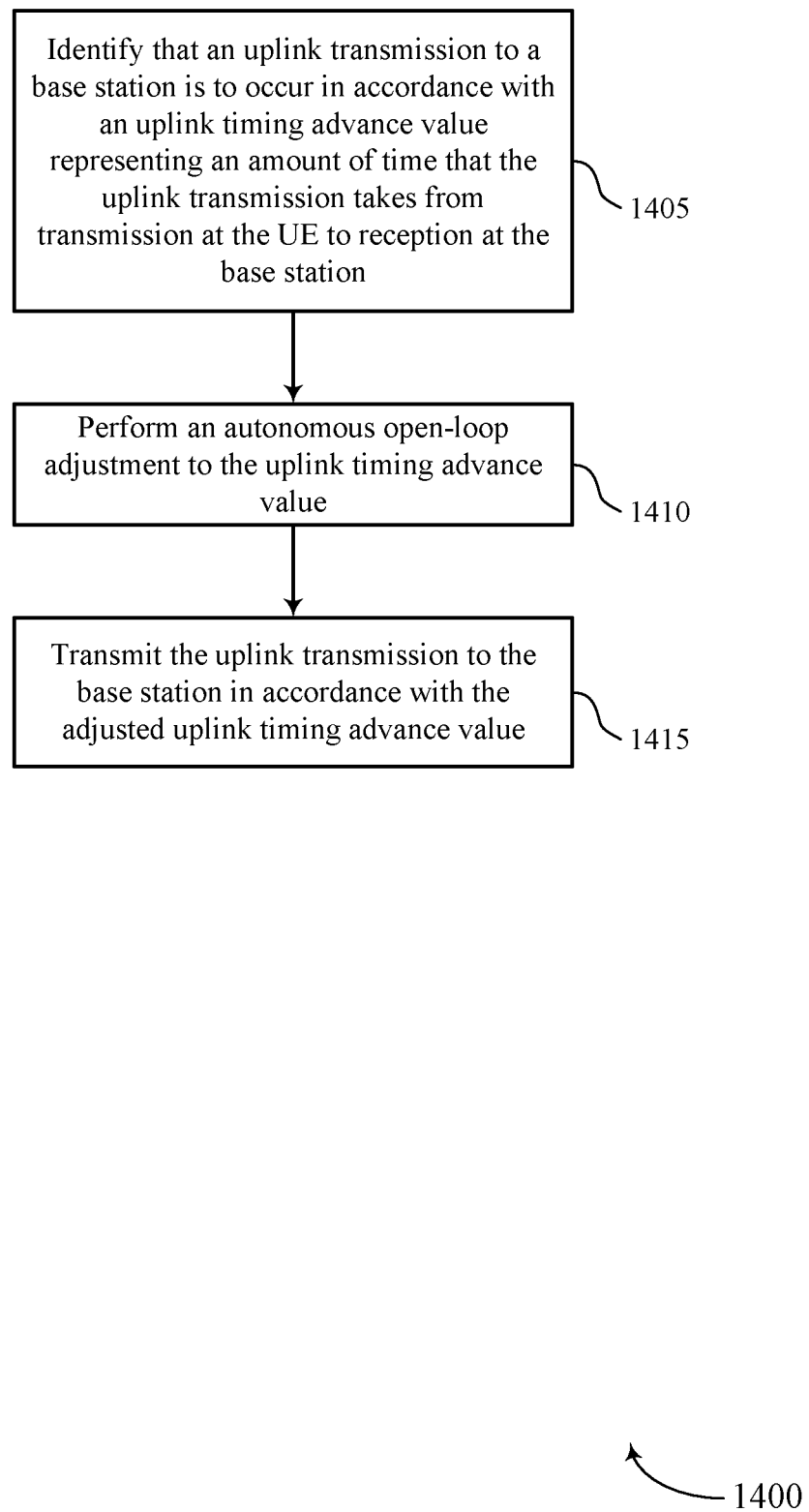
FIGS. 14 through 17 illustrate methods for open loop uplink timing advance in accordance with aspects of the present disclosure.

FIG. 14 shows a flowchart illustrating a method 1400 for open loop uplink timing advance in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1405 the UE 115 may identify that an uplink transmission to a base station is to occur in accordance with an uplink timing advance value representing an amount of time that the uplink transmission takes from transmission at the UE to reception at the base station. The operations of 1405 may be performed according to the methods described herein. In certain examples, aspects of the operations of 1405 may be performed by a uplink transmission manager as described with reference to FIGS. 6 through 9.

At 1410 the UE 115 may perform an autonomous open-loop adjustment to the uplink timing advance value. The operations of 1410 may be performed according to the methods described herein. In certain examples, aspects of the operations of 1410 may be performed by a timing advance adjustment manager as described with reference to FIGS. 6 through 9.

At 1415 the UE 115 may transmit the uplink transmission to the base station in accordance with the adjusted uplink timing advance value. The operations of 1415 may be performed according to the methods described herein. In certain examples, aspects of the operations of 1415 may be performed by a uplink transmission manager as described with reference to FIGS. 6 through 9.

Figure 15:
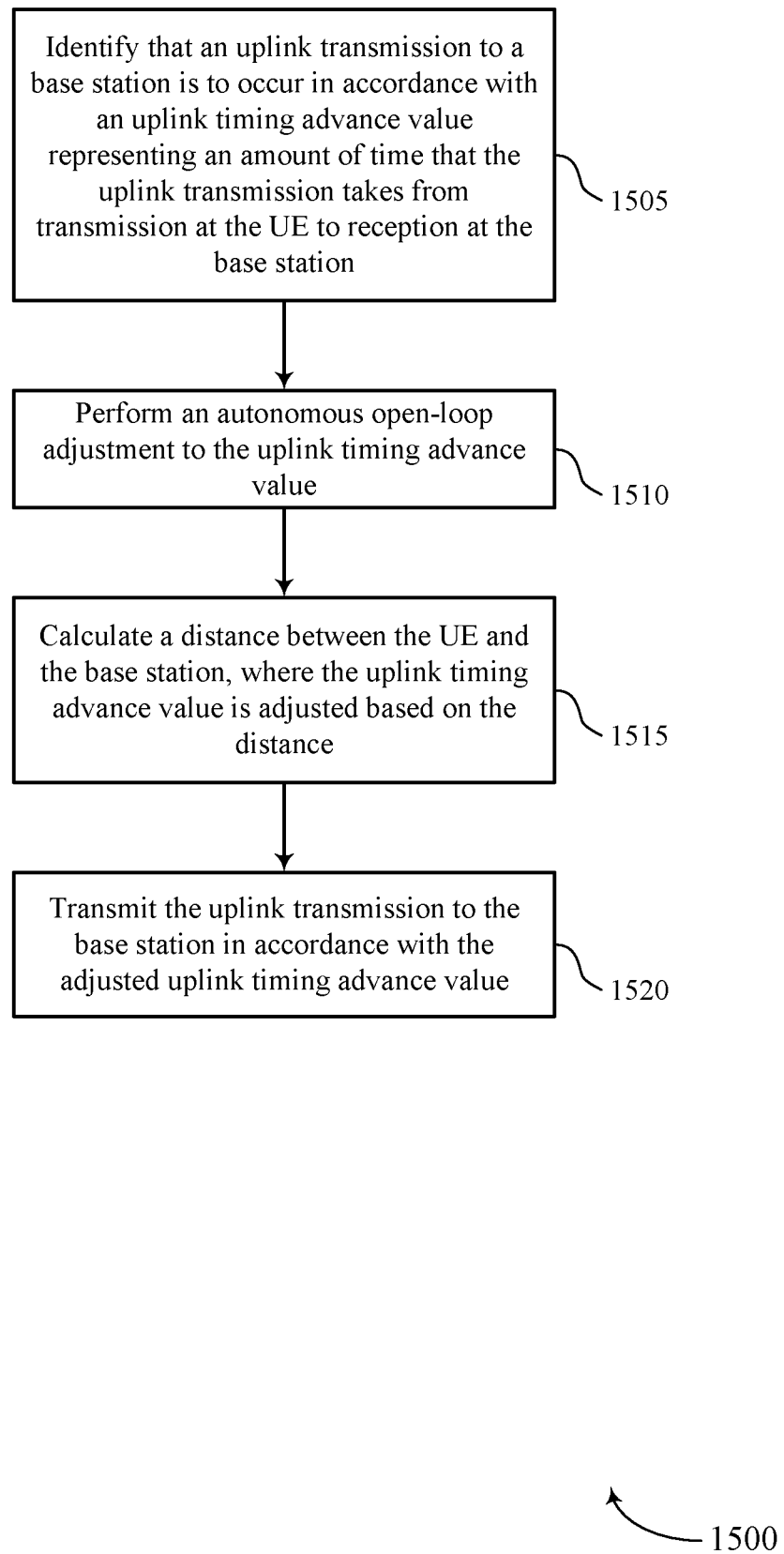

FIG. 15 shows a flowchart illustrating a method 1500 for open loop uplink timing advance in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may identify that an uplink transmission to a base station is to occur in accordance with an uplink timing advance value representing an amount of time that the uplink transmission takes from transmission at the UE to reception at the base station. The operations of 1505 may be performed according to the methods described herein. In certain examples, aspects of the operations of 1505 may be performed by a uplink transmission manager as described with reference to FIGS. 6 through 9.

At 1510 the UE 115 may perform an autonomous open-loop adjustment to the uplink timing advance value. The operations of 1510 may be performed according to the methods described herein. In certain examples, aspects of the operations of 1510 may be performed by a timing advance adjustment manager as described with reference to FIGS. 6 through 9.

At 1515 the UE 115 may calculate a distance between the UE and the base station, and the uplink timing advance value is adjusted based at least in part on the distance. The operations of 1515 may be performed according to the methods described herein. In certain examples, aspects of the operations of 1515 may be performed by a distance calculation manager as described with reference to FIGS. 6 through 9.

At 1520 the UE 115 may transmit the uplink transmission to the base station in accordance with the adjusted uplink timing advance value. The operations of 1520 may be performed according to the methods described herein. In certain examples, aspects of the operations of 1520 may be performed by a uplink transmission manager as described with reference to FIGS. 6 through 9.

Figure 16:
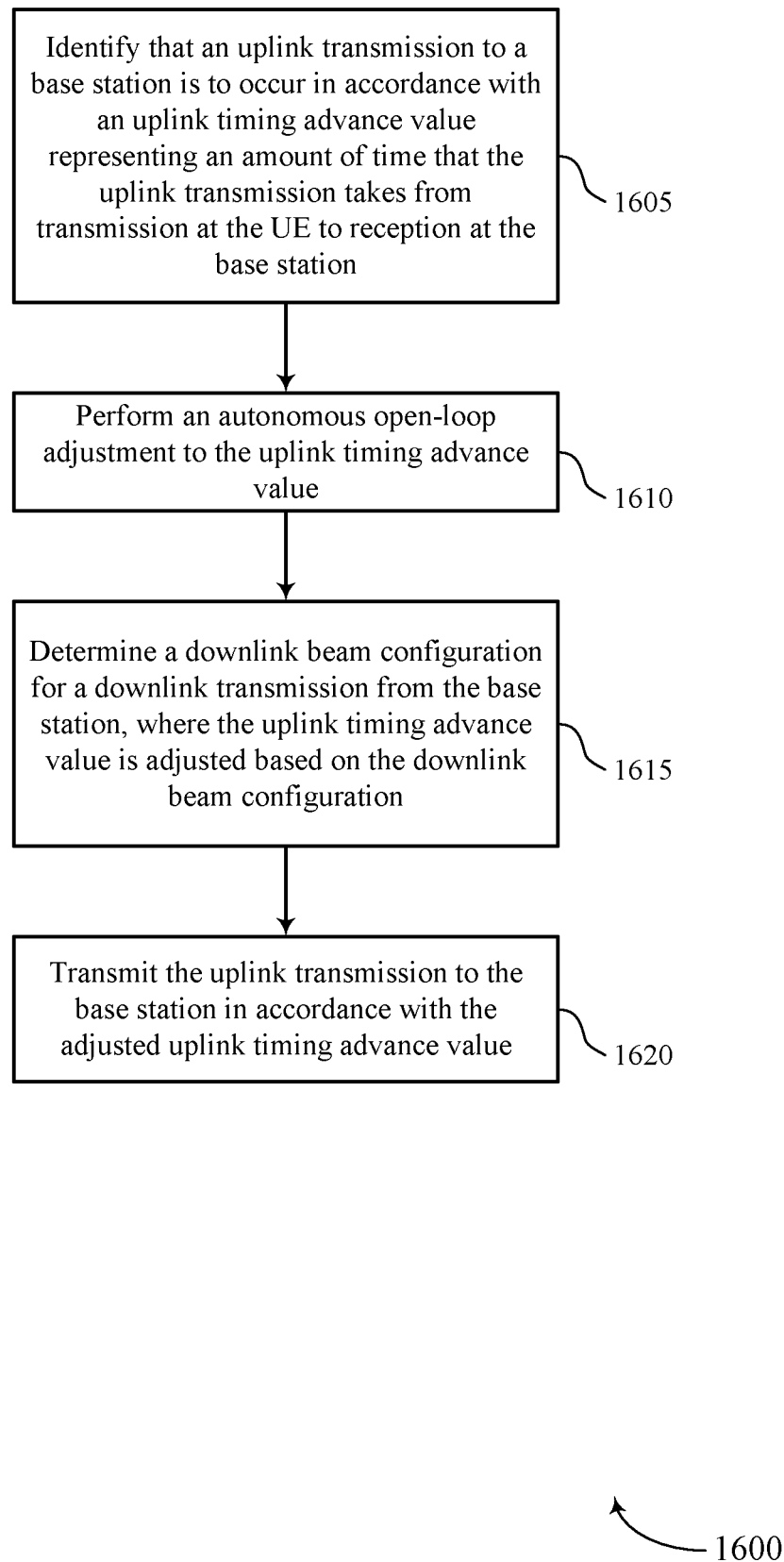

FIG. 16 shows a flowchart illustrating a method 1600 for open loop uplink timing advance in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1605 the UE 115 may identify that an uplink transmission to a base station is to occur in accordance with an uplink timing advance value representing an amount of time that the uplink transmission takes from transmission at the UE to reception at the base station. The operations of 1605 may be performed according to the methods described herein. In certain examples, aspects of the operations of 1605 may be performed by a uplink transmission manager as described with reference to FIGS. 6 through 9.

At 1610 the UE 115 may perform an autonomous open-loop adjustment to the uplink timing advance value. The operations of 1610 may be performed according to the methods described herein. In certain examples, aspects of the operations of 1610 may be performed by a timing advance adjustment manager as described with reference to FIGS. 6 through 9.

At 1615 the UE 115 may determine a downlink beam configuration for a downlink transmission from the base station, and the uplink timing advance value is adjusted based at least in part on the downlink beam configuration. The operations of 1615 may be performed according to the methods described herein. In certain examples, aspects of the operations of 1615 may be performed by a beam configuration manager as described with reference to FIGS. 6 through 9.

At 1620 the UE 115 may transmit the uplink transmission to the base station in accordance with the adjusted uplink timing advance value. The operations of 1620 may be performed according to the methods described herein. In certain examples, aspects of the operations of 1620 may be performed by a uplink transmission manager as described with reference to FIGS. 6 through 9.

Figure 17:
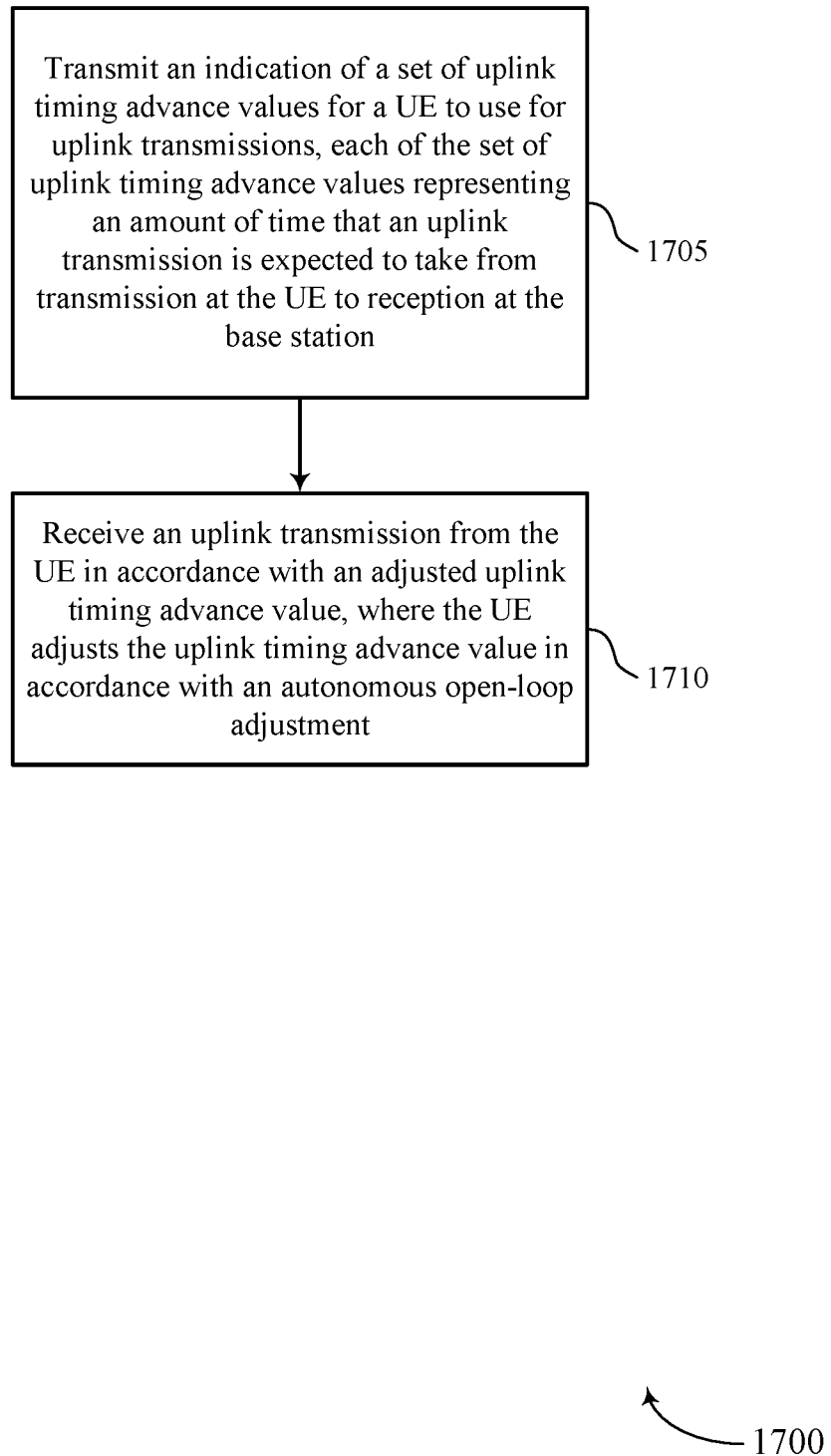

FIG. 17 shows a flowchart illustrating a method 1700 for open loop uplink timing advance in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1705 the base station 105 may transmit an indication of a set of uplink timing advance values for a UE to use for uplink transmissions, each of the set of uplink timing advance values representing an amount of time that an uplink transmission is expected to take from transmission at the UE to reception at the base station. The operations of 1705 may be performed according to the methods described herein. In certain examples, aspects of the operations of 1705 may be performed by a timing advance manager as described with reference to FIGS. 10 through 13.

At 1710 the base station 105 may receive an uplink transmission from the UE in accordance with an adjusted uplink timing advance value, and the UE adjusts the uplink timing advance value in accordance with an autonomous open-loop adjustment. The operations of 1710 may be performed according to the methods described herein. In certain examples, aspects of the operations of 1710 may be performed by a uplink reception manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from an access network entity, a signal indicating a set of available uplink timing advance values for communications by the UE to the access network entity;
   identifying that an uplink transmission to an access network entity is to occur in accordance with a first uplink timing advance value of the set of available uplink timing advance values, the first uplink timing advance value representing an amount of time that the uplink transmission takes from transmission at the UE to reception at the access network entity;

performing an autonomous open-loop adjustment to the first uplink timing advance value based at least in part on a distance between the UE and the access network entity, wherein the autonomous open-loop adjustment results in a second uplink timing advance value of the set of available uplink timing advance values; and transmitting the uplink transmission to the access network entity in accordance with the second uplink timing advance value.

2. The method of claim 1, further comprising: performing a satellite positioning system (SPS) measurement of a UE position and using the SPS measurement and an access network entity position to adjust the first uplink timing advance value.

3. The method of claim 1, wherein adjusting the first uplink timing advance value based at least in part on the distance between the UE and the access network entity comprises adjusting the first uplink timing advance value based at least in part on at least one of a physical distance between the UE and the access network entity, or an angular distance between the UE and the access network entity, or a travel distance from the UE to the access network entity, or a round-trip-time (RTT) distance associated with a wireless transmission between the UE and the access network entity, or a combination thereof.

4. The method of claim 1, further comprising:
determining a downlink beam configuration for a downlink transmission from the access network entity, wherein the first uplink timing advance value is adjusted based at least in part on the downlink beam configuration.

5. The method of claim 4, wherein the downlink beam configuration is mapped to one or more uplink timing advance values of the set of available uplink timing advance values.

6. The method of claim 4, wherein the downlink beam configuration comprises at least one of a downlink beam direction, or a downlink beam index, or a downlink beam departure angle, or a combination thereof.

7. The method of claim 1, further comprising:
receiving a signal from the access network entity indicating that the UE is to use a third uplink timing advance value, the third uplink timing advance value being different from the second uplink timing advance value.

8. The method of claim 1, further comprising:
receiving an indication from the access network entity triggering the UE to perform the autonomous open-loop adjustment based at least in part on the set of available uplink timing advance values.

9. The method of claim 1, further comprising: determining, at the UE, the distance between the UE and the access network entity, wherein the UE performs the autonomous open-loop adjustment to the first uplink timing advance value based on the distance determined at the UE.

10. An apparatus for wireless communication at a user equipment (UE), comprising:
a processor;
memory in electronic communication with the processor; and
instructions stored in the memory and executable by the processor to cause the apparatus to:
receive, from an access network entity, a signal indicating a set of available uplink timing advance values for communications by the UE to the access network entity;
identify that an uplink transmission to the access network entity is to occur in accordance with a first uplink timing advance value of the set of available uplink timing advance values, the first uplink timing advance value representing an amount of time that the uplink transmission takes from transmission at the UE to reception at the access network entity;
perform an autonomous open-loop adjustment to the first uplink timing advance value based at least in part on a distance between the UE and the access network entity, wherein the autonomous open-loop adjustment results in a second uplink timing advance value of the set of available uplink timing advance values; and
transmit the uplink transmission to the access network entity in accordance with the second uplink timing advance value.

11. The apparatus of claim 10, wherein the instructions are further executable by the processor to cause the apparatus to:
perform a satellite positioning system (SPS) measurement of a UE position and use the SPS measurement and a access network entity position to adjust the first uplink timing advance value.

12. The apparatus of claim 10, wherein the instructions are further executable by the processor to cause the apparatus to adjust the first uplink timing advance value based at least in part on the distance between the UE and the access network entity by adjusting the first uplink timing advance value based at least in part on at least one of a physical distance between the apparatus and the access network entity, or an angular distance between the apparatus and the access network entity, or a travel distance from the apparatus to the access network entity, or a round-trip-time (RTT) distance associated with a wireless transmission between the apparatus and the access network entity, or a combination thereof.

13. The apparatus of claim 10, wherein the instructions are further executable by the processor to cause the apparatus to:
determine a downlink beam configuration for a downlink transmission from the access network entity, wherein the first uplink timing advance value is adjusted based at least in part on the downlink beam configuration.

14. The apparatus of claim 13, wherein the downlink beam configuration is mapped to one or more uplink timing advance values of the set of available uplink timing advance values.

15. The apparatus of claim 13, wherein the downlink beam configuration comprises at least one of a downlink beam direction, or a downlink beam index, or a downlink beam departure angle, or a combination thereof.

16. The apparatus of claim 10, wherein the instructions are further executable by the processor to cause the apparatus to:
receive a signal from the access network entity indicating that the UE is to use a third uplink timing advance value, the third uplink timing advance value being different from the second uplink timing advance value.

17. The apparatus of claim 10, wherein the instructions are further executable by the processor to cause the apparatus to:
receive an indication from the access network entity triggering the apparatus to perform the autonomous open-loop adjustment based at least in part on the set of available uplink timing advance values.

* * * * *